United States Patent
Mehta et al.

(10) Patent No.: US 11,916,779 B2
(45) Date of Patent: Feb. 27, 2024

(54) PEER COMPARISON-BASED OUTLIER DETECTION FOR NETWORK PERFORMANCE MONITORING

(71) Applicant: Juniper Networks, Inc., Sunnyvale, CA (US)

(72) Inventors: Ruchit Rajkumar Mehta, Emeryville, CA (US); Kaushik Adesh Agrawal, Chelmsford, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 17/938,706

(22) Filed: Oct. 7, 2022

(65) Prior Publication Data
US 2023/0116881 A1   Apr. 13, 2023

Related U.S. Application Data

(60) Provisional application No. 63/262,241, filed on Oct. 7, 2021.

(51) Int. Cl.
| | |
|---|---|
| *H04L 43/065* | (2022.01) |
| *H04L 45/24* | (2022.01) |
| *H04L 45/44* | (2022.01) |
| *H04L 45/12* | (2022.01) |

(52) U.S. Cl.
CPC ............ *H04L 45/24* (2013.01); *H04L 43/065* (2013.01); *H04L 45/123* (2013.01); *H04L 45/44* (2013.01)

(58) Field of Classification Search
None
See application file for complete search history.

(56) References Cited

U.S. PATENT DOCUMENTS

| | | |
|---|---|---|
| 9,729,439 B2 | 8/2017 | MeLampy et al. |
| 9,729,682 B2 | 8/2017 | Kumar et al. |
| 9,762,485 B2 | 9/2017 | Kaplan et al. |
| 9,871,748 B2 | 1/2018 | Gosselin et al. |
| 9,985,883 B2 | 5/2018 | MeLampy et al. |
| 10,200,264 B2 | 2/2019 | Menon et al. |
| 10,277,506 B2 | 4/2019 | Timmons et al. |
| 10,432,522 B2 | 10/2019 | Kaplan et al. |
| 10,756,983 B2 | 8/2020 | Ratkovic et al. |

(Continued)

OTHER PUBLICATIONS

International Search Report and Written Opinion of International Application No. PCT/US2022/077795 dated Jan. 20, 2023, 14 pp.

*Primary Examiner* — Joshua Joo
(74) *Attorney, Agent, or Firm* — Shumaker & Sieffert, P.A.

(57) ABSTRACT

Techniques are described for determining one or more outlier logical paths in a computer network. A cloud-based network management system stores path data received from a plurality of network devices operating as network gateways for an enterprise network, the path data collected by each network device of the plurality of network devices for one or more logical paths of a physical interface from the network device over a wide area network (WAN). The network management system compares the path data for the plurality of logical paths to determine one or more outlier logical paths out of the plurality of logical paths. The network management system, in response to determining the one or more outlier logical paths, output a notification indicative of the one or more outlier path data out of the plurality of logical paths.

16 Claims, 8 Drawing Sheets

(56) References Cited

U.S. PATENT DOCUMENTS

| | | | |
|---|---|---|---|
| 10,992,543 B1 | 4/2021 | Rachamadugu et al. | |
| 11,165,863 B1 | 11/2021 | Timmons et al. | |
| 2012/0030352 A1* | 2/2012 | Sauma Vargas | H04L 43/022 709/224 |
| 2014/0177455 A1* | 6/2014 | Astigarraga | H04L 43/0858 370/252 |
| 2015/0195126 A1 | 7/2015 | Vasseur et al. | |
| 2016/0197799 A1* | 7/2016 | Clemm | H04L 41/0803 709/202 |
| 2016/0294677 A1* | 10/2016 | Kazerani | H04L 45/247 |
| 2017/0034036 A1* | 2/2017 | Kohan | H04L 67/51 |
| 2017/0302505 A1 | 10/2017 | Zafer et al. | |
| 2018/0075106 A1* | 3/2018 | Haver | H04L 43/028 |
| 2020/0296029 A1* | 9/2020 | Shenoy | H04L 45/036 |
| 2020/0366589 A1 | 11/2020 | Kaplan et al. | |
| 2020/0366590 A1 | 11/2020 | Kaplan et al. | |
| 2020/0366598 A1 | 11/2020 | Kaplan et al. | |
| 2020/0366599 A1 | 11/2020 | Kaplan et al. | |
| 2020/0374336 A1* | 11/2020 | Murgia | H04L 47/2491 |
| 2020/0403890 A1 | 12/2020 | McCulley et al. | |
| 2021/0158260 A1 | 5/2021 | Kolar et al. | |
| 2021/0218651 A1* | 7/2021 | Rangarajan | H04L 43/026 |
| 2022/0166663 A1* | 5/2022 | Banka | H04W 24/08 |

* cited by examiner

PEER COMPARISON-BASED OUTLIER DETECTION FOR NETWORK PERFORMANCE MONITORING

This application claims the benefit of U.S. Provisional Patent Application No. 63/262,241, filed Oct. 7, 2021, the entire contents of which is incorporated herein by reference.

TECHNICAL FIELD

This disclosure generally relates to computer networks and, more specifically, monitoring and/or managing network performance in computer networks.

BACKGROUND

A computer network is a collection of interconnected computing devices that can exchange data and share resources. Example computing devices include routers, switches, and other layer two (L2) network devices that operate within layer two of the Open Systems Interconnection (OSI) reference model, i.e., the data link layer, and layer three (L3) network devices that operate within layer three of the OSI reference model, i.e., the network layer. Network devices within computer networks often include a control unit that provides control plane functionality for the network device and forwarding components for routing or switching data units.

SUMMARY

In general, this disclosure describes techniques for monitoring network performance to identify paths in the network having performance issues. A cloud-based network management system (NMS) receives the path data from the network devices. The path data is indicative of one or more aspects of network performance as monitored on each logical path between network devices over a wide area network (WAN), e.g., a broadband network, Long Term Evolution (LTE) network, or Multi-protocol Label Switching (MPLS) network. The NMS may compare the path data associated with logical paths between the network devices to determine, based on the path data, one or more logical paths that are outliers compared with other logical paths. For example, the one or more outlier logical paths may have relatively poor network performance compared with the other logical paths. Based on determining the one or more outlier logical paths, the NMS may notify users (e.g., administrators of the WAN) of the one or more outlier logical paths. Further, the NMS may also recommend or invoke one or more remedial actions to address the outlier logical paths.

A given network device may establish multiple logical paths (e.g., peer paths or tunnels) over the WAN with multiple other network devices on a single physical interface. Each of the network devices may include a software agent or other module configured to report path data collected at a logical path level to the NMS in the cloud and/or the path data may be retrieved from the network devices by the NMS via an application programming interface (API) or an open configuration protocol. The cloud-based NMS may store the path data received from the network devices over time and, thus, provide a network performance history of the network devices.

In examples where the network devices comprise session-based routers, a given session-based router may establish multiple peer paths over the WAN with multiple other session-based routers on a single physical interface. Each of the session-based routers may include a software agent imbedded in the session-based router configured to report the path data collected at a peer path level to the NMS in the cloud. In examples where the network devices comprise packet-based routers, a given packet-based router may establish multiple tunnels over the WAN with multiple other packet-based routers on a single physical interface. Each of the packet-based routers may collect data at a tunnel level, and the tunnel data may be retrieved by the NMS via an API or an open configuration protocol or the tunnel data may be reported to the NMS by a software agent or other module running on the packet-based router.

According to the disclosed techniques, a network management system is configured to monitor the logical paths, such as peer paths, from the network devices over the WAN to detect one or more outlier logical paths. To perform such outlier detection, the network management system may compare logical paths, such as peer paths, within a specific region (e.g., a geographic region), logical paths within an organization (e.g., a company or a division of the company), logical paths of similar organizational deployments, and the like, to determine one or more outlier logical paths out of the logical paths.

In some examples, the network management system is configured to determine, out of a set of logical paths, one or more logical paths that are outliers in network performance as the one or more outlier logical paths. For example, the one or more outlier logical paths may have network performance (e.g., jitter, latency, and/or loss) that are in the bottom 5% of the set of logical paths in the comparison. Based on determining the one or more outlier logical paths, the NMS may notify users (e.g., administrators of the WAN) of the one or more outlier logical paths. Further, the NMS may also recommend or invoke one or more remedial actions to address the outlier logical paths.

The techniques of the disclosure provide one or more technical advantages and practical applications. The techniques may enable the cloud-based NMS to detect poor performing logical paths that may be missed by determining whether such logical paths meet various service level agreement (SLA) metrics. Because determining whether a logical path meets a SLA metric may include determining how much the network performance of the logical path deviates from a baseline network performance, a logical path that always performs poorly compared with other logical paths may continue to meet the SLA metric without improving its network performance. By detecting whether the network performance of a logical path is an outlier from the network performance of other logical paths, the techniques of the disclosure may enable the NMS to detect such poor performing logical paths that may be missed by applying SLA requirements to such logical paths.

In addition, the NMS may provide user visibility into WAN link health for the enterprise network by generating and outputting notifications that indicate the one or more outlier logical paths. For example, the NMS may generate data representative of a user interface for display on a user interface device, e.g., operated by a network administrator of the enterprise network. The user interface may present indications of the one or more outlier logical paths in the WAN. The NMS may further generate and output notifications, e.g., to the network administrator of the enterprise network, with recommendations to perform one or more remedial actions to address the outlier logical paths. In other examples, the NMS may instead automatically invoke the one or more remedial actions to address the outlier logical paths, such as performing automatic WAN link selection to satisfy application-dependent SLAs.

In some aspects, the techniques described herein relate to a network management system including: a memory storing path data for a plurality of logical paths received from a plurality of network devices operating as network gateways for an enterprise network, the path data collected by each network device of the plurality of network devices for a respective one or more logical paths of a physical interface from a given network device over a wide area network (WAN); and one or more processors coupled to the memory and configured to: compare the path data for the plurality of logical paths to determine one or more outlier logical paths out of the plurality of logical paths; and in response to determining the one or more outlier logical paths, output a notification indicative of the one or more outlier logical paths out of the plurality of logical paths.

In some aspects, the techniques described herein relate to a method including: receiving, by one or more processors of a network management system from plurality of network devices operating as network gateways for an enterprise network, path data for a plurality of logical paths collected by each network device of the plurality of network devices for a respective one or more logical paths of a physical interface from a given network device over a wide area network (WAN); comparing, by the one or more processors, the path data for the plurality of logical paths to determine one or more outlier logical paths out of the plurality of logical paths; and in response to determining the one or more outlier logical paths, outputting, by the one or more processors, a notification indicative of the one or more outlier logical paths out of the plurality of logical paths.

In some aspects, the techniques described herein relate to a computer-readable storage medium including instructions that, when executed, cause one or more processors of a network management system to: receive, from plurality of network devices operating as network gateways for an enterprise network, path data for a plurality of logical paths collected by each network device of the plurality of network devices for a respective one or more logical paths of a physical interface from a given network device over a wide area network (WAN); compare the path data for the plurality of logical paths to determine one or more outlier logical paths out of the plurality of logical paths; and in response to determining the one or more outlier logical paths, output a notification indicative of the one or more outlier logical paths out of the plurality of logical paths.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and description.

DETAILED DESCRIPTION

Figure 1A:
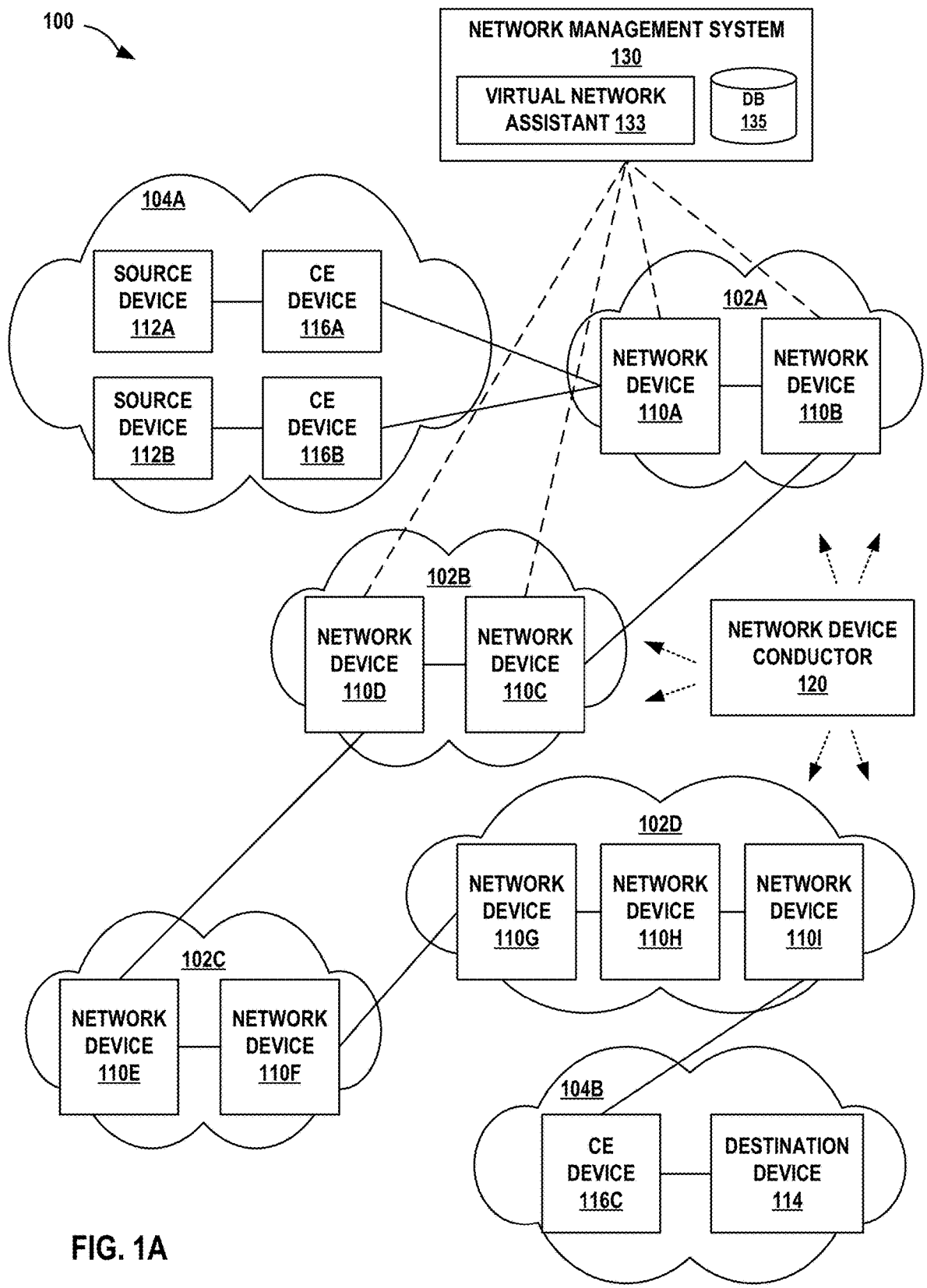
FIGS. 1A-1C are block diagrams illustrating example network systems including a network management system that is configured to monitor network performance and manage network faults in an enterprise network based on one or more WAN link health assessments, in accordance with one or more techniques of the disclosure.
Figure 1B:
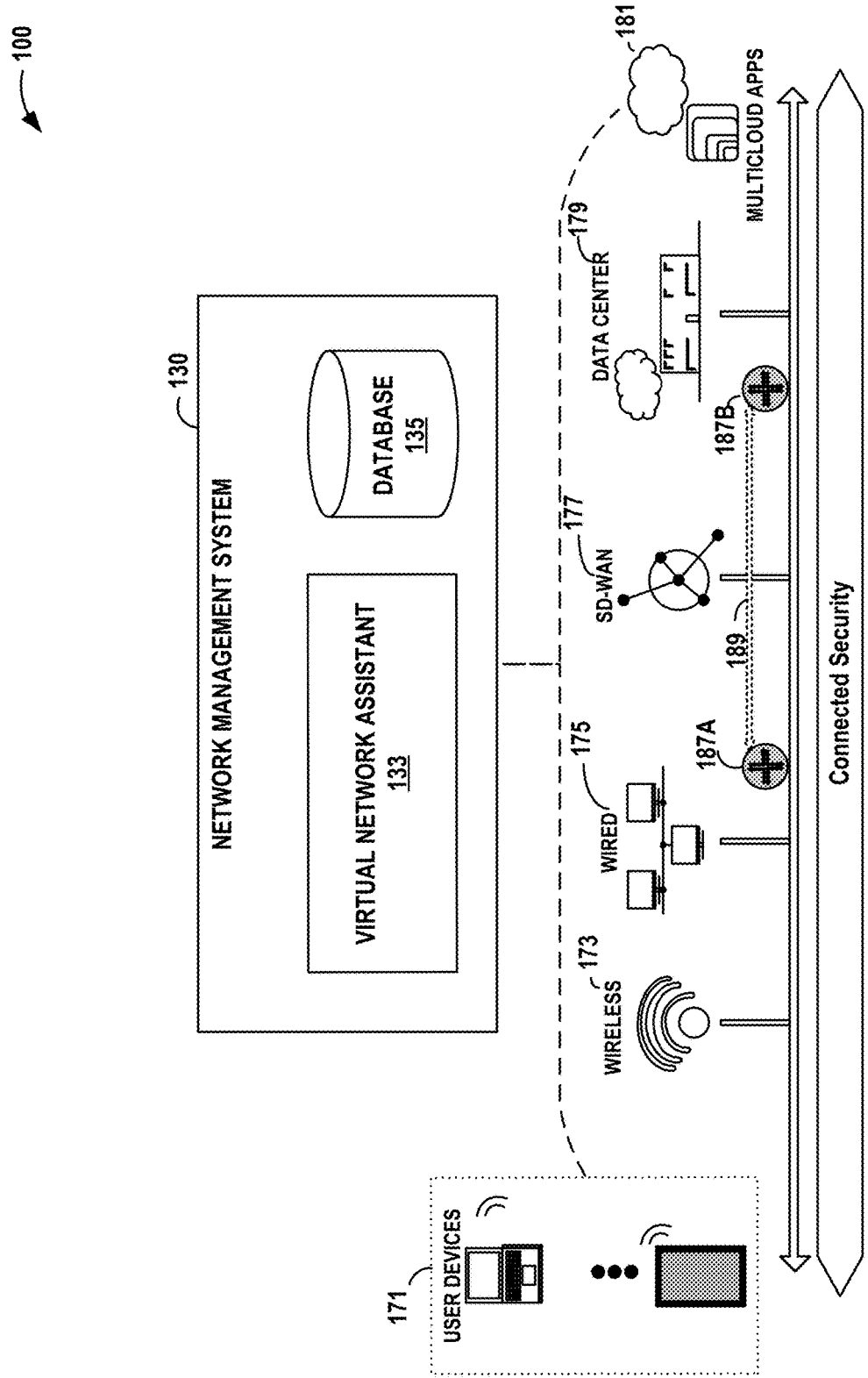
Figure 1C:
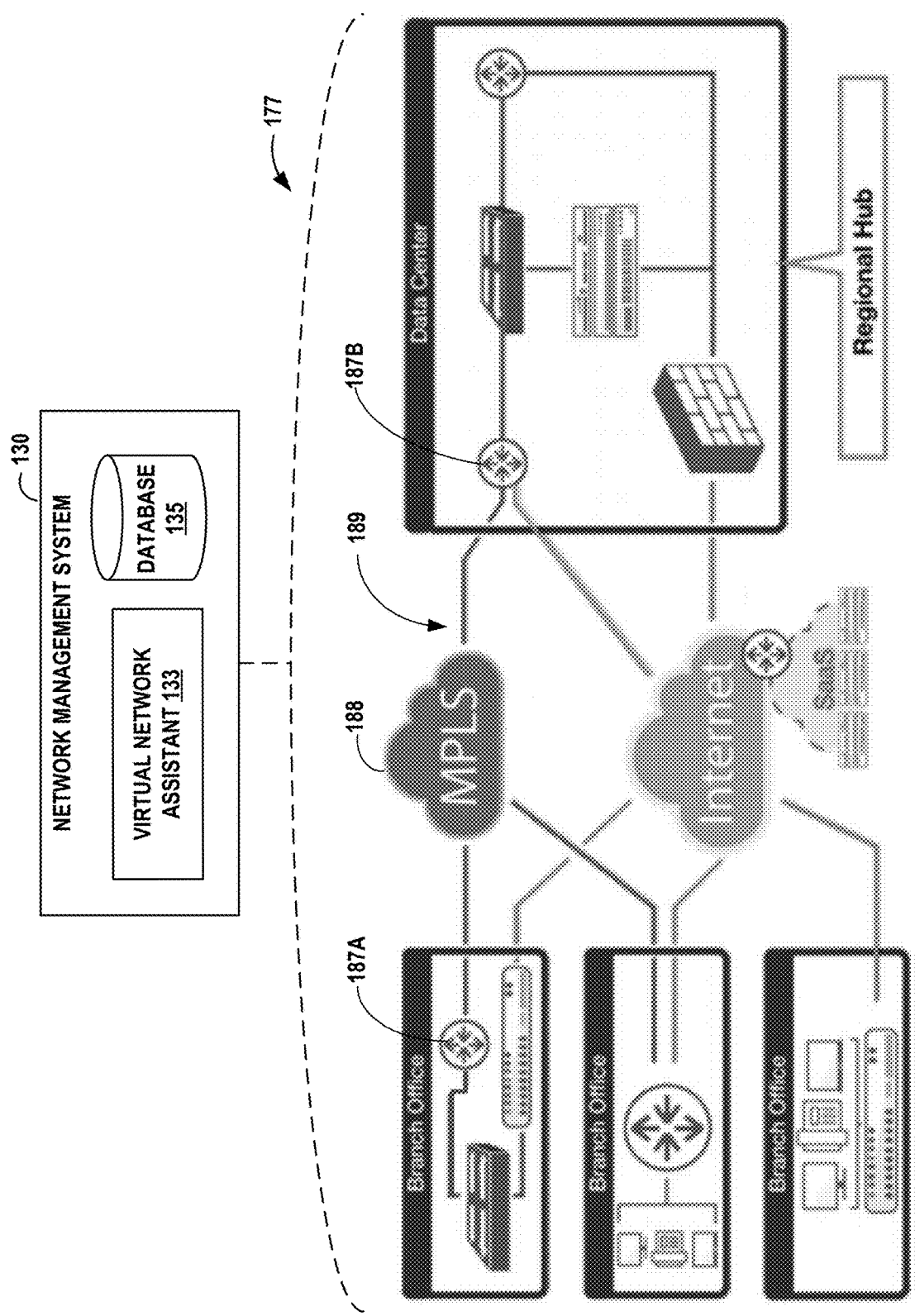

FIGS. 1A-1C are block diagrams illustrating example network systems 100 including a network management system (NMS) 130 that is configured to monitor network performance and manage network faults in an enterprise network based on one or more WAN link health assessments, in accordance with one or more techniques of the disclosure.

FIG. 1A is a block diagram illustrating example network system 100 in accordance with the techniques of the disclosure. In the example of FIG. 1A, network system 100 includes networks 102A-102D (collectively, "networks 102") configured to provide Wide Area Network (WAN) connectivity to different customer networks 104A-104B ("customer networks 104") of an enterprise network. In some examples, networks 102 are service provider networks. Although in the example of FIG. 1A, network system 100 is illustrated as including multiple interconnected networks 102, in other examples network system 100 may alternatively include a single network that provides connectivity between customer networks 104.

Network devices 110A-110I (collectively, "network devices 110") of networks 102 provide source devices 112A and 112B (collectively, "source devices 112") and destination device 114 associated with customer networks 104 with access to networks 102 via customer edge devices 116A-116C (collectively, "CE devices 116"). Communication links between network devices 110 may be Ethernet, ATM, or any other suitable network connections.

Network device conductor 120 is a centralized management and policy engine that provides orchestration, administration, and zero-touch provisioning for distributed network devices 110 while maintaining a network-wide, multitenant service, and policy data model. Network device conductor 120 may be considered an orchestrator. In some examples, network device conductor 120 also provides monitoring and analytics for network devices 110, while in other examples monitoring and analytics for network devices 110 and/or CE devices 116 are provided by NMS 130 only. In some examples, NMS 130 provides WAN Assurance services to networks 102 and provides Wireless Assurance and/or Wired Assurance services to customer networks 104. In the example of FIG. 1A, NMS 130 includes a virtual network assistant 133 which may provide machine-learning based analytics of data collected by NMS 130 from network devices 110 of networks 102 for the WAN Assurance services, and may provide machine-learning based analytics of data collected by NMS 130 from CE devices 116 or other customer equipment within customer networks 104 for the Wireless Assurance and/or Wired Assurance services.

CE devices 116 and network devices 110 are discussed herein for purposes of example as being routers. However, techniques of the disclosure may be implemented using any network device, such as switches, routers, gateways, or other suitable network devices that may send and receive network traffic. Customer networks 104 may be networks for geographically separated sites of the enterprise network, for example. Each of customer networks 104 may include additional customer equipment, such as, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices not depicted in FIG. 1A. The configuration of network system 100 illustrated in FIG. 1A is merely an example. For example, network system 100 may include any number of customer networks 104. Nonetheless, for ease of description, only customer networks 104A-104B are illustrated in FIG. 1A.

Networks 102 represent one or more publicly accessible computer networks that are owned and operated by one or more service providers. A service provider is usually a large telecommunications entity or corporation. Each of networks 102 is usually a large Layer-Three (L3) computer network, where reference to a layer followed by a number refers to a corresponding layer in the Open Systems Interconnection (OSI) model. Each network 102 is an L3 network in the sense that it natively supports L3 operations as described in the OSI model. Common L3 operations include those performed in accordance with L3 protocols, such as the Internet Protocol (IP). L3 is also known as a "network layer" in the OSI model and the term L3 may be used interchangeably with the phrase "network layer" throughout this disclosure.

Although not illustrated, each network 102 may be coupled to one or more networks administered by other providers, and may thus form part of a large-scale public network infrastructure, e.g., the Internet. Consequently, customer networks 104 may be viewed as edge networks of the Internet. Each network 102 may provide computing devices within customer networks 104, such as source devices 112 and destination devices 114, with access to the Internet, and may allow the computing devices within customer networks 104 to communicate with each other.

Although additional network devices are not shown for ease of explanation, network system 100 may comprise additional network and/or computing devices such as, for example, one or more additional switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Moreover, although the elements of network system 100 are illustrated as being directly coupled, one or more additional network elements may be included along any of the communication links between network devices 110, such that the network elements of computer network system 100 are not directly coupled.

Each network 102 typically provides a number of residential and business services for customer networks 104, including residential and business class data services (which are often referred to as "Internet services" in that these data services permit access to the collection of publicly accessible networks referred to as the Internet), residential and business class telephone and/or voice services, and residential and business class television services.

In some examples, network devices 110 comprise packet-based routers that employ a packet- or flow-based routing scheme to forward packets according to defined network paths established by a centralized controller, such as a Software-Defined Networking (SDN) controller, that performs path selection and traffic engineering. A given one of network devices 110, e.g., network device 110A, that comprises a packet-based router operating as a network gateway for customer network 104A may establish multiple tunnels over the WAN with one or more other packet-based routers, e.g., network device 110I, operating as network gateways for other sites of the enterprise network, e.g., customer network 104B. As described herein, each of the packet-based routers may collect data at a tunnel level, and the tunnel data may be retrieved by NMS 130 via an API or an open configuration protocol or the tunnel data may be reported to NMS 130 by a software agent or other module running on the packet-based router.

In other examples, network devices 110 comprise session-based routers that employ a stateful, session-based routing scheme that enables each network device 110 to independently perform path selection and traffic engineering. The use of session-based routing may enable network devices 110 to eschew the use of a centralized controller, such as an SDN controller, to perform path selection and traffic engineering. In this way, network devices 110 may be more efficient and scalable for large networks where the use of an SDN controller would be infeasible. Furthermore, the use of session-based routing may enable network devices 110 to eschew the use of tunnels, thereby saving considerable network resources by obviating the need to perform encapsulation and decapsulation at tunnel endpoints. In some examples, network devices 110 implement session-based routing as Secure Vector Routing (SVR), provided by Juniper Networks, Inc. A given one of network devices 110, e.g., network device 110A, that comprises a session-based router operating as a network gateway for customer network 104A may establish multiple peer paths over the WAN with one or more other session-based routers, e.g., network device 110I, operating as network gateways for other sites of the enterprise network, e.g., customer network 104B. As described herein, each of the session-based routers may include a software agent imbedded in the session-based router configured to report path data collected at a peer path level to NMS 130.

A network session (also referred to herein as a "session") includes a forward packet flow originating from a first device and destinated for a second device and/or a reverse packet flow originating from the second device and destined for the first device. The session may be bidirectional in that the session may include packets travelling in both directions (e.g., a forward packet flow and a reverse packet flow) between the first and second devices.

When, e.g., network device 110A receives a packet for a flow originating from source device 112A and destined for destination device 114, network device 110A determines whether the packet belongs to a new session (e.g., is the "first" packet or "lead" packet of the session). In some examples, network device 110A determines whether a source address, source port, destination address, destination port, and protocol of the first packet matches an entry in a session table. If no such entry exists, network device 110A determines that the packet belongs to a new session and creates an entry in the session table. Furthermore, if the packet belongs to a new session, network device 110A generates a session identifier for the session. The session identifier may comprise, e.g., a source address and source port of source device 112A, a destination address and destination port of destination device 114, and a protocol used by the first packet. Network device 110A may use the session identifier to identify subsequent packets as belonging to the session.

In some examples, network devices 110 perform stateful routing for a session. This means that network devices 110 forward each packet of the forward packet flow of a session sequentially and along the same forward network path. As described herein, the "same" forward path means the same network devices 110 that form a segment or at least a portion between a device originating the packet and a device to which the packet is destined (and not necessarily the entire network path between the device originating the packet and the device to which the packet is destined). Further, network devices 110 forward each packet of the return flow of the session sequentially and along the same return network path. The forward network path for the forward packet flow and the return network path of the return flow may be the same path, or different paths. By ensuring that each packet of a flow is forwarded sequentially and along the same path, network devices 110 maintain the state of the entire flow at each network device 110, thereby enabling the use of stateful packet services, such as Deep Packet Inspection (DPI).

In the example of FIG. 1A, a stateful routing session may be established from ingress network device 110A through intermediate network devices 110B-110H to egress network device 110I. In this example, network device 110A determines that the first packet is an unmodified packet and the first packet of a new session. Network device 110A modifies the first packet to include metadata specifying the session identifier (e.g., the original source address, source port, destination address, and destination port). Network device 110A replaces the header of the modified first packet to specify a source address that is an address of network device 110A, a source port that is a port via which network device 110A forwards the modified first packet toward destination device 114, a destination address that is an address of the next hop to which network device 110A forwards the first packet (e.g., an address of network device 110B), and a destination port that is a port of the next hop to which network device 110A forwards the first packet (e.g., a port of network device 110B).

Network device 110A may further identify a network service associated with the session. For example, network device 110A may compare one or more of a source address, source port, destination address, or destination port for the session to a table of service address and port information to identify a service associated with the session. Examples of network services include Hypertext Transfer Protocol (HTTP), a firewall service, a proxy service, packet monitoring or metrics services, etc. For example, if the source port and/or destination port for the session is 80, network device may determine that the session is associated with HTTP. In other examples, network device 110A may determine that one or more of a source address, source port, destination address, or destination port for the session belong to a block of address or ports indicative that a particular service is associated with the session.

In some examples, network device 110A uses the determined network service for the session to select a forward path for forwarding the first packet and each subsequent packet toward destination device 114. In this fashion, network device 110A may perform service-specific path selection to select a network path that best suits the requirements of the service. In contrast to a network topology that uses an SDN controller to perform path selection, each network device 110 performs path selection. Further, the use of session-based routing enables each network device 110 to make routing decisions at the service- or application-level, in contrast to conventional network devices that are only able to make routing decisions at the flow level.

Network device 110A forwards the modified first packet to network device 110B. Additionally, network device 110A stores the session identifier for the session such that, upon receiving subsequent packets for the session, network device 110A may identify subsequent packets as belonging to the same session and forward the subsequent packets along the same path as the first packet.

Intermediate network device 110B receives the modified first packet and determines whether the modified first packet includes a portion of metadata specifying the session identifier. In response to determining that the modified first packet includes metadata specifying the session identifier, intermediate network device 110B determines that network device 110B is not an ingress device such that network device 110B does not attach metadata specifying the session identifier.

As described above with respect to network device 110A, network device 110B determines whether the packet belongs to a new session (e.g., is the "first" packet or "lead" packet of the session) by determining whether a source address, source port, destination address, destination port, and protocol of the first packet matches an entry in a session table. If no such entry exists, network device 110B determines that the packet belongs to a new session and creates an entry in the session table. Furthermore, if the packet belongs to a new session, network device 110B generates a session identifier for the session. The session identifier used by network device 110B to identify the session for the first packet may be different from the session identifier used by network device 110A to identify the same session for the first packet, because each network device 110A, 110B uses the header source address, source port, destination address, and destination port of the first packet to generate the session identifier, and this information is modified by each preceding network device 110 as each network device 110 forwards the first packet along the forward path. Furthermore, each network device 110 may store this header information to identify a previous network device 110 (or "waypoint") and a next network device 110 (or "waypoint") such that each network device 110 may reconstruct the same forward path and reverse path for each subsequent packet of the session.

Network device 110B replaces the header of the modified first packet to specify a source address that is an address of network device 110B, a source port that is a port via which network device 110B forwards the modified first packet toward destination device 114, a destination address that is an address of the next hop to which network device 110B forwards the first packet (e.g., an address of network device 110C), and a destination port that is a port of the next hop to which network device 110B forwards the first packet (e.g., a port of network device 110C). Network device 110B forwards the modified first packet to network device 110C. Additionally, network device 110B stores the session identifier for the session such that, upon receiving subsequent packets for the session, network device 110B may identify subsequent packets as belonging to the same session and forward the subsequent packets along the same path as the first packet.

Subsequent intermediate network devices 110C-110H process the modified first packet in a similar fashion as network devices 110A and 110B such that network devices 110 forward the subsequent packets of the session along the same path as the first packet. Further, each network device 110 stores a session identifier for the session, which may include an identification of the previous network device 110 along the network path. Thus, each network device 110 may use the session identifier to forward packets of the reverse packet flow for the session along the same network path back to source device 112A.

A network device 110 that may forward packets for a forward packet flow of the session to a destination for the packet flow is an egress, or "terminus" network device. In the foregoing example, network device 110I is a terminus network device because network device 110I may forward packets to CE device 116C for forwarding to destination device 114. Network device 110I receives the modified first packet that comprises the metadata specifying the session identifier (e.g., the original source address, source port, destination address, and destination port). Network device 110I identifies the modified first packet as destined for a service terminating at network device 110I by determining that the destination source address and destination source port specified in the metadata of the modified lead packet corresponds to a destination reachable by network device 110I (e.g., destination device 114 via CE device 116C). Network device 110I recovers the original first packet by removing the metadata from the modified first packet and modifying the header of the first packet to specify the original source address, source port, destination address, and destination port. Network device 110I forwards the recovered first packet to CE device 116C for forwarding to destination device 114.

Additional information with respect to session-based routing and SVR is described in U.S. Pat. No. 9,729,439, entitled "COMPUTER NETWORK PACKET FLOW CONTROLLER," and issued on Aug. 8, 2017; U.S. Pat. No. 9,729,682, entitled "NETWORK DEVICE AND METHOD FOR PROCESSING A SESSION USING A PACKET SIGNATURE," and issued on Aug. 8, 2017; U.S. Pat. No. 9,762,485, entitled "NETWORK PACKET FLOW CONTROLLER WITH EXTENDED SESSION MANAGEMENT," and issued on Sep. 12, 2017; U.S. Pat. No. 9,871,748, entitled "ROUTER WITH OPTIMIZED STATISTICAL FUNCTIONALITY," and issued on Jan. 16, 2018; U.S. Pat. No. 9,985,883, entitled "NAME-BASED ROUTING SYSTEM AND METHOD," and issued on May 29, 2018; U.S. Pat. No. 10,200,264, entitled "LINK STATUS MONITORING BASED ON PACKET LOSS DETECTION," and issued on Feb. 5, 2019; U.S. Pat. No. 10,277,506, entitled "STATEFUL LOAD BALANCING IN A STATELESS NETWORK," and issued on Apr. 30, 2019; and U.S. Pat. No. 10,432,522, entitled "NETWORK PACKET FLOW CONTROLLER WITH EXTENDED SESSION MANAGEMENT," and issued on Oct. 1, 2019; and U.S. Patent Application Publication No. 2020/0403890, entitled "IN-LINE PERFORMANCE MONITORING," published on Dec. 24, 2020, the entire content of each of which is incorporated herein by reference in its entirety.

In some examples, to implement session-based routing, each network device 110 maintains a local repository of service and topology state information for each other network device 110. The service and topology state information includes services reachable from each network device 110, as well as a network topology from each network device for reaching these services. Each network device 110 may transmit changes in the services reachable from the network device 110 and/or changes in the network topology for reaching the services from the network device to a central repository, e.g., a server. Further, each network device 110 may receive service and topology state information for each other network device 110 in computer network system 100 from the central repository.

In the foregoing example, network device 110A receives a packet, determines a session for a packet flow comprising the packet, determines a service associated with the session, and selects a network path for forwarding the packet. Network device 110A may use its local copy of the service and topology state information for each network device 110 to select the network path for forwarding the packet. For example, network device 110A may use the identified service associated with the packet and a network topology for reaching the identified service to select a network path that comports with a Service Level Agreement (SLA) requirement or other performance requirements for the service. Network device 110A may then forward the packet and subsequent packets for the flow along the selected path. In this fashion, network device 110A may perform service-specific path selection in that network device 110 may use criteria specific to the service associated with the packet to select a network path that best suits the requirements of the service. In other examples, network device 110A may select a network path that avoids (i.e., does not include) one or more paths that are outliers in network performance, as discussed in further detail below, in order to select a network path having a high network performance.

In some examples, interfaces of network devices 110 may be assigned to one or more "neighborhoods." A "neighborhood" is defined as a label applied to an interface of a network device 110. The network devices 110 within the same neighborhood are capable of forming a peering relationship with one another. For example, each network device 110 having an interface to which a neighborhood label is applied is reachable over a Layer-3 network to each other network device 110 having an interface to which the same neighborhood label is applied. In some examples, one or more neighborhoods may be aggregated into a "district." A district is a logical grouping of one or more neighborhoods. Typically, an Autonomous System (AS) (also referred to herein as an "Authority") may be divided into one or more districts, each district including one or more neighborhoods.

In some examples, each network device 110 maintains a local repository of service and topology state information only for those other network devices 110 within the same neighborhood. In some examples, each network device 110 maintains a local repository of service and topology state information only for those other network devices 110 within the same district of neighborhoods. As an example, each service provider network 102 may be considered to be a different "district," wherein each subdomain within each service provider network 102 may be considered to be a neighborhood within that district. In this example, each network device 110A and 110B within service provider network 102A may maintain service and topology state information only for one another, and not for network devices 110C-110I. Similarly, each network device 110D and 110C within service provider network 102B may maintain service and topology state information only for one another, and not for network devices 110A-110B or 110E-110I. In other examples, an administrator may assign one or more service provider networks 102 into one or more districts, one or more neighborhoods, or a combination of districts and neighborhoods as suits the needs of network system 100.

Additional information with respect to the exchange of service and topology state information is described in U.S. Patent Application Publication No. 2020/0366590, entitled "CENTRAL AUTHORITY FOR SERVICE AND TOPOLOGY EXCHANGE," published on Nov. 19, 2020; U.S. Patent Application Publication No. 2020/0366599, entitled "SOURCE-BASED ROUTING," published on Nov. 19, 2020; U.S. Patent Application Publication No. 2020/0366598, entitled "SERVICE AND TOPOLOGY EXCHANGE PROTOCOL," published on Nov. 19, 2020; U.S. Patent Application Publication No. 2020/0366589, entitled "ROUTING USING SEGMENT-BASED METRICS," published on Nov. 19, 2020; and U.S. patent application Ser. No. 16/050,722, entitled "NETWORK NEIGHBORHOODS FOR ESTABLISHING COMMUNICATION RELATIONSHIPS BETWEEN COMMUNICATION INTERFACES IN AN ADMINISTRATIVE DOMAIN," filed on Jul. 31, 2018, the entire content of each of which is incorporated herein by reference in its entirety.

In accordance with the techniques of the disclosure, NMS 130 is configured to monitor network performance and manage network faults that may impact user experiences in an enterprise network (e.g., experiences of source devices 112 and/or destination device 114 in customer networks 104) based on path data received from one or more network devices 110 operating as network gateways for the enterprise network. NMS 130 receives the path data from network devices 110 and stores the path data received over time in database 135. The path data is indicative of one or more aspects of network performance as monitored on each logical path (e.g., peer path or tunnel) between network devices 110 over the WAN, e.g., a broadband network, Long Term Evolution (LTE) network, or Multi-protocol Label Switching (MPLS) network. NMS 130 includes virtual network assistant 133 having a peer path performance engine that compares logical paths based on the path data to determine one or more outlier logical paths out of the compared logical paths. Based on the determination of one or more outlier logical paths, NMS 130 may perform on or more actions, such as identifying a root cause of the outlier logical paths and/or automatically recommending or invoking one or more remedial actions to address the one or more outlier logical paths.

A given network device, e.g., network device 110A, may establish multiple logical paths (e.g., peer paths for a session-based router or tunnels for a packet-based router) on a single physical interface over the WAN with multiple other network devices, e.g., network device 110I. One or more of network devices 110A may include a software agent or other module configured to report path data collected at a logical path level to NMS 130. In other examples, the path data may be retrieved from one or more of network devices 110 by NMS 130 via an API or an open configuration protocol. The cloud-based NMS may store the path data received from the network devices over time and, thus, provide a network performance history of the network devices.

According to the disclosed techniques, NMS 130 is configured to monitor the performance of the logical paths from network devices 110 over the WAN to detect performance degradation that may impact user experiences. For example, the peer path performance engine of virtual network assistant 133 compares one or more metrics of the network performance (e.g., jitter, latency, or packet loss) and/or application performance of a set of logical paths to determine one or more outlier logical paths out of the set of logical paths. Such metrics of the network performance may include WAN link metrics such as jitter, latency, or packet loss. Such metrics of the network performance may also include application metrics such as retransmissions and round-trip time for Transmission Control Protocol (TCP) acknowledgement. In some examples, such metrics of the network performance may also include correlations of degraded logical path performance with high bandwidth usage and/or long term link stability. In some examples, such metrics of the network performance may include the mean opinion score (MOS) of logical paths, which may be a metric used within the telecommunications industry to assess voice quality, and which may range from 1-6.

Such network performance data and/or application performance data may be included in the path data for the set of logical paths. The set of logical paths may be within a geographic region (e.g., within a same country, a same state, a same province, a same city, a same neighborhood, etc.), within an organization (e.g., a company, a school, etc.), a department of the organization, of similar organizational deployments, and/or any suitable set of logical paths that may be compared to determine one or more outlier logical paths. The peer path performance engine may, for example, determine the one or more outlier logical paths to be the logical paths out of the set of logical paths that are below a specified performance threshold. For example, the one or more outlier logical paths may be the one or more logical paths that are in the bottom 5% in network performance out of the set of logical paths.

In some examples, the peer path performance engine may determine the one or more outlier logical paths based on network performance data for a wide deployment of logical paths that are collected over a long time horizon, such as data collected over a week, over two weeks, over a month, and the like, and the peer path performance engine may compare the network performance data of the logical paths against each other and/or against a global distribution of the network performance data of the logical paths. The peer path performance engine may compare features derived from the network performance data of the logical paths against each other to determine one or more outlier logical paths, which may be one or more logical paths that deviate from the global distribution of the features derived from the network performance data of the logical paths. The details of this aspect of the disclosure is discussed in detail with respect to FIG. 3.

NMS 130 may therefore present indications of the one or more outlier logical paths in the WAN. NMS 130 may further generate and output notifications, e.g., to the network administrator of the WAN, with recommendations to perform one or more remedial actions to address the outlier logical paths. In other examples, NMS 130 may instead automatically invoke the one or more remedial actions to address the outlier logical paths.

The techniques of the disclosure provide one or more technical advantages and practical applications. The techniques may enable the cloud-based NMS to detect poor performing logical paths that may be missed by determining whether such logical paths meet various service level agreement (SLA) metrics. Because determining whether a logical path meets a SLA metric may include determining how much the network performance of the logical path deviates from a baseline network performance, a logical path that always performs poorly compared with other logical paths may continue to meet the SLA metric without improving its network performance. By detecting whether the network performance of a logical path is an outlier from the network performance of other logical paths, the techniques of the disclosure may enable NMS 130 to detect such poor performing logical paths that may be missed by applying SLA requirements to such logical paths.

In addition, NMS 130 may provide user visibility into WAN link health for the enterprise network by generating and outputting notifications that indicate the one or more outlier logical paths. For example, NMS 130 may generate data representative of a user interface for display on a user interface device, e.g., operated by a network administrator of the enterprise network. The user interface may present indications of the one or more outlier logical paths in the WAN. NMS 130 may further generate and output notifications, e.g., to the network administrator of the enterprise network, with recommendations to perform one or more remedial actions to address the outlier logical paths. In other examples, NMS 130 may instead automatically invoke the one or more remedial actions to address the outlier logical paths, such as selecting and/or changing the logical paths that are used by applications in order to satisfy application-dependent SLAs based on the detection of one or more outlier logical paths. For example, if NMS 130 determines an outlier logical path having a high latency that is used by a latency-sensitive application, NMS 130 may select a different logical path for the latency-sensitive application and/or may switch another application that is less latency sensitive to use the outlier logical path. That is, NMS 130 may perform path steering and/or path selection based on the determination of an outlier logical path.

FIG. 1B is a block diagram illustrating further example details of network system 100 of FIG. 1A. In this example, FIG. 1B illustrates NMS 130 configured to operate according to an artificial intelligence/machine-learning-based computing platform providing comprehensive automation, insight, and assurance (e.g., Wireless Assurance, Wired Assurance and/or WAN Assurance) spanning from a wireless network 173 and wired LAN 175 at the network edge (far left of FIG. 1B) to cloud-based application services 181 hosted by computing resources within data centers 179 (far right of FIG. 1). Referring back to FIG. 1A, user devices 171 may comprise one or more of source devices 112 and destination device 114, and wired LAN 175 hosting wireless network 173 may comprise one or more customer networks 104 of the enterprise network.

As described herein, NMS 130 provides an integrated suite of management tools and implements various techniques of this disclosure. In general, NMS 130 may provide a cloud-based platform for wireless network data acquisition, monitoring, activity logging, reporting, predictive analytics, network anomaly identification, and alert generation. For example, NMS 130 may be configured to proactively monitor and adaptively configure network system 100 so as to provide self-driving capabilities. Moreover, VNA 133 includes a natural language processing engine to provide AI-driven support and troubleshooting, anomaly detection, AI-driven location services, and AI-drive RF optimization with reinforcement learning.

As illustrated in the example of FIG. 1B, AI-driven NMS 130 also provides configuration management, monitoring and automated oversight of software defined wide-area network (SD-WAN) 177, which operates as an intermediate network communicatively coupling wireless networks 173 and wired LANs 175 to data centers 179 and application services 181. In general, SD-WAN 177 provides seamless, secure, traffic-engineered connectivity between "spoke" routers 187A of edge wired networks 175 hosting wireless networks 173, such as branch or campus networks (e.g., customer networks 104 from FIG. 1A as sites of an enterprise network), to "hub" routers 187B further up the cloud stack toward cloud-based application services 181. Referring back to FIG. 1A, routers 187A, 187B may comprise network devices 110 operating as network gateways for the enterprise network.

SD-WAN 177 often operates and manages an overlay network on an underlying physical Wide-Area Network (WAN), which provides connectivity to geographically separate customer networks, e.g., customer networks 104 of FIG. 1A. In other words, SD-WAN 177 may extend SDN capabilities and/or session-based routing or SVR capabilities to a WAN that allow networks to decouple underlying physical network infrastructure from virtualized network infrastructure and applications such that the networks may be configured and managed in a flexible and scalable manner.

In some examples, underlying routers of SD-WAN 177 may implement a stateful, session-based routing scheme in which the routers 187A, 187B dynamically modify contents of original packet headers sourced by user devices 171 to steer traffic along selected paths, e.g., peer path 189, toward application services 181 without requiring use of tunnels and/or additional labels. In this way, routers 187A, 187B may be more efficient and scalable for large networks since the use of tunnel-less, session-based routing may enable routers 187A, 187B to achieve considerable network resources by obviating the need to perform encapsulation and decapsulation at tunnel endpoints. Moreover, in some examples, each router 187A, 187B may independently perform path selection and traffic engineering to control packet flows associated with each session without requiring use of a centralized SDN controller for path selection and label distribution. In some examples, routers 187A, 187B implement session-based routing as SVR, provided by Juniper Networks, Inc.

Additional information with respect to session-based routing and SVR is described in U.S. Pat. No. 9,729,439, entitled "COMPUTER NETWORK PACKET FLOW CONTROLLER," and issued on Aug. 8, 2017; U.S. Pat. No. 9,729,682, entitled "NETWORK DEVICE AND METHOD FOR PROCESSING A SESSION USING A PACKET SIGNATURE," and issued on Aug. 8, 2017; U.S. Pat. No. 9,762,485, entitled "NETWORK PACKET FLOW CONTROLLER WITH EXTENDED SESSION MANAGEMENT," and issued on Sep. 12, 2017; U.S. Pat. No. 9,871,748, entitled "ROUTER WITH OPTIMIZED STATISTICAL FUNCTIONALITY," and issued on Jan. 16, 2018; U.S. Pat. No. 9,985,883, entitled "NAME-BASED ROUTING SYSTEM AND METHOD," and issued on May 29, 2018; U.S. Pat. No. 10,200,264, entitled "LINK STATUS MONITORING BASED ON PACKET LOSS DETECTION," and issued on Feb. 5, 2019; U.S. Pat. No. 10,277,506, entitled "STATEFUL LOAD BALANCING IN A STATELESS NETWORK," and issued on Apr. 30, 2019; U.S. Pat. No. 10,432,522, entitled "NETWORK PACKET FLOW CONTROLLER WITH EXTENDED SESSION MANAGEMENT," and issued on Oct. 1, 2019; and U.S. Patent Application Publication No. 2020/0403890, entitled "IN-LINE PERFORMANCE MONITORING," published on Dec. 24, 2020, the entire content of each of which is incorporated herein by reference in its entirety.

In some examples, AI-driven NMS 130 may enable intent-based configuration and management of network system 100, including enabling construction, presentation, and execution of intent-driven workflows for configuring and managing devices associated with wireless networks 173, wired LAN networks 175, and/or SD-WAN 177. For example, declarative requirements express a desired configuration of network components without specifying an exact native device configuration and control flow. By utilizing declarative requirements, what should be accomplished may be specified rather than how it should be accomplished. Declarative requirements may be contrasted with imperative instructions that describe the exact device configuration syntax and control flow to achieve the configuration. By utilizing declarative requirements rather than imperative instructions, a user and/or user system is relieved of the burden of determining the exact device configurations required to achieve a desired result of the user/system. For example, it is often difficult and burdensome to specify and manage exact imperative instructions to configure each device of a network when various different types of devices from different vendors are utilized. The types and kinds of devices of the network may dynamically change as new devices are added and device failures occur. Managing various different types of devices from different vendors with different configuration protocols, syntax, and software versions to configure a cohesive network of devices is often difficult to achieve. Thus, by only requiring a user/system to specify declarative requirements that specify a desired result applicable across various different types of devices, management and configuration of the network devices becomes more efficient. Further example details and techniques of an intent-based network management system are described in U.S. Pat. No. 10,756,983, entitled "Intent-based Analytics," and U.S. Pat. No. 10,992,543, entitled "Automatically generating an intent-based network model of an existing computer network," each of which is hereby incorporated by reference.

In accordance with the techniques described in this disclosure, NMS 130 is configured to monitor network performance to determine outlier logical paths that may impact user experiences in the enterprise network based on path data received from one or more network devices operating as network gateways for the enterprise network (e.g., routers 187A, 187B). NMS 130 receives the path data from routers 187A, 187B that is indicative of one or more aspects of network performance as monitored on each logical path 189, e.g., peer path or tunnel, between routers 187A, 187B in SD-WAN 177 over an underlying physical WAN, and stores the path data in database 135 over time.

NMS 130 includes virtual network assistant 133 having a peer path performance engine that determines one or more outlier logical paths having a reduced network performance compared with other logical paths based on the path data in database 135. The peer path performance engine may compare a set of logical paths that are within the same geographic region out of a plurality of geographic regions, that are within the same organization, or are otherwise associated with a related characteristic.

The peer path performance engine may compare the network performance data specified by the path data for each logical path in the set of logical paths to determine one or more outlier logical paths. For example, the peer path performance engine may determine a network performance associated with a logical path in the set of logical paths to be an outlier if the network performance is below a specified performance threshold. For example, a network performance associated with a logical path in the set of logical paths may be an outlier if the network performance is in the bottom 5% of network performance for the set of logical paths. In this way, the peer path performance engine may determine one or more outlier logical paths each having network performance that is below the specified performance threshold. Virtual network assistant 133 of NMS 130 may, upon determining the one or more outlier logical paths, automatically recommend or invoke one or more remedial actions to address the identified one or more outlier logical paths.

FIG. 1C is a block diagram illustrating further example details of network system 100 of FIG. 1B. In particular, FIG. 1C illustrates an example SD-WAN deployment architecture of SD-WAN 177 of FIG. 1B. In the illustrated example, SD-WAN 177 includes a spoke router 187A within a branch office connecting to a hub router 187B in a data center via logical path 189 over the underlying physical WAN, e.g., MPLS network 188. SD-WAN 177 also includes a hosted or Software as a Service (SaaS) applications.

When troubleshooting SD-WAN issues, it may be beneficial to separate the issues into three segments: 1) branch office, 2) logical path (e.g., peer path or tunnel) over WAN, e.g., MPLS, LTE or Broadband network, and 3) application services including both internally hosted applications (e.g., in the data center) and SaaS applications. NMS 130 may be configured to track the temporal connectivity topology of these three segments for each customer deployment and also detect various types of user-impacting issues in virtual network assistant 133. By joining the connectivity topology with the corresponding events happened in each segment, virtual network assistant 133 of NMS 130 may be able to pinpoint the location and root cause of different user-impacting SD-WAN issues. Examples of user-impacting issues for the branch office segment may include device health, bad cable, and configuration issues (e.g., maximum transmission unit (MTU)). Examples of user-impacting issues for the logical path segment may include link connectivity and link performance degradation. Examples of user-impacting issues for the application services segment may include service reachability and service performance.

In accordance with the techniques described in this disclosure, virtual network assistant 133 of NMS 130 has a peer path performance engine configured to monitor the health condition of a set of logical paths from, for example, the spoke routers, e.g., logical path 189 from router 187A, and detect performance degradation that may impact user experiences. The peer path performance engine may aggregate path data received from network devices, e.g., routers 187A, 187B, over a selected period of time and at a selected granularity-level (e.g., site-level or network device-level). The network devices may collect logical path statistics, for example, via bidirectional forwarding detection (BFD) probing. The peer path performance engine may compare the network performance data specified by the path data for each logical path in the set of logical paths to determine one or more outlier logical paths, which may be logical paths having network performance is below a specified performance threshold compared with the other logical paths in the set of logical paths.

Figure 2:
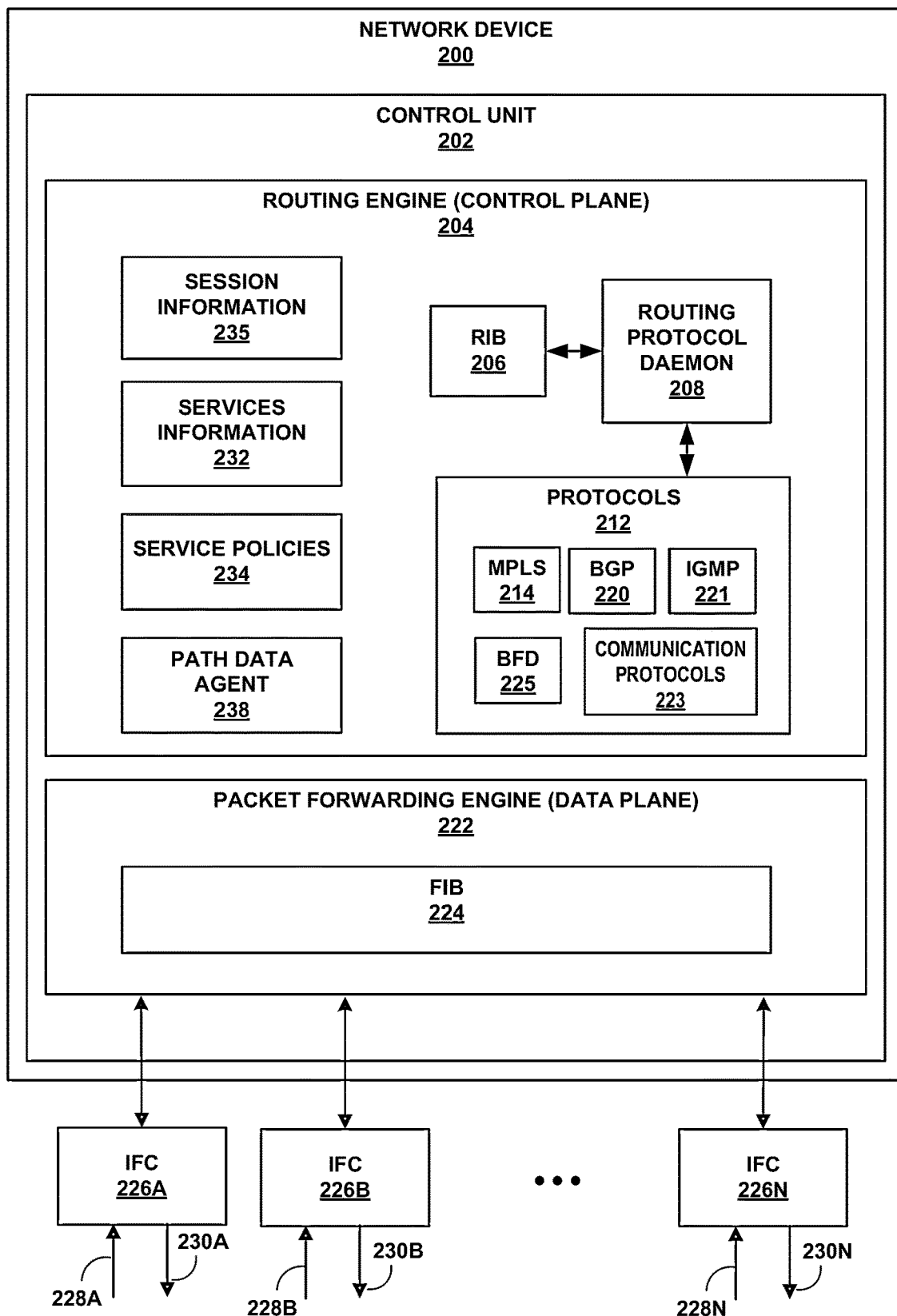
FIG. 2 is a block diagram illustrating an example network device in accordance with the techniques of the disclosure.

FIG. 2 is a block diagram illustrating an example network device 200 in accordance with the techniques of the disclosure. In general, network device 200 may be an example of one of network devices 110 of FIG. 1A or one of routers 187A, 187B of FIGS. 1B and 1C. In this example, network device 200 includes interface cards 226A-226N ("IFCs 226") that receive packets via incoming links 228A-228N ("incoming links 228") and send packets via outbound links 230A-230N ("outbound links 230"). IFCs 226 are typically coupled to links 228, 230 via a number of interface ports. Network device 200 also includes a control unit 202 that determines routes of received packets and forwards the packets accordingly via IFCs 226.

Control unit 202 may comprise routing engine 204 and packet forwarding engine 222. Routing engine 204 operates as the control plane for network device 200 and includes an operating system that provides a multi-tasking operating environment for execution of a number of concurrent processes. Routing engine 204 communicates with other routers, e.g., such as network devices 110 of FIG. 1A, to establish and maintain a computer network, such as network system 100 of FIGS. 1A-1C, for transporting network traffic between one or more customer devices. Routing protocol daemon (RPD) 208 of routing engine 204 executes software instructions to implement one or more control plane networking protocols 212. For example, protocols 212 may include one or more routing protocols, such as Internet Group Management Protocol (IGMP) 221 and/or Border Gateway Protocol (BGP) 220, for exchanging routing information with other routing devices and for updating routing information base (RIB) 206, Multiprotocol Label Switching (MPLS) protocol 214, and other routing protocols. Protocols 212 may further include one or more communication session protocols 223, such as TCP, UDP, TLS, or ICMP. Protocols 212 may also include one or more performance monitoring protocols, such as BFD 225.

RIB 206 may describe a topology of the computer network in which network device 200 resides, and may also include routes through the shared trees in the computer network. RIB 206 describes various routes within the computer network, and the appropriate next hops for each route, i.e., the neighboring routing devices along each of the routes. Routing engine 204 analyzes information stored in RIB 206 and generates forwarding information for forwarding engine 222, stored in forwarding information base (FIB) 224. FIB 224 may associate, for example, network destinations with specific next hops and corresponding IFCs 226 and physical output ports for output links 230. FIB 224 may be a radix tree programmed into dedicated forwarding chips, a series of tables, a complex database, a link list, a radix tree, a database, a flat file, or various other data structures.

FIB 224 may also include lookup structures. Lookup structures may, given a key, such as an address, provide one or more values. In some examples, the one or more values may be one or more next hops. A next hop may be implemented as microcode, which when executed, performs one or more operations. One or more next hops may be "chained," such that a set of chained next hops perform a set of operations for respective different next hops when executed. Examples of such operations may include applying one or more services to a packet, dropping a packet, and/or forwarding a packet using an interface and/or interface identified by the one or more next hops.

Session information 235 stores information for identifying sessions. In some examples, session information 235 is in the form of a session table. For example, services information 232 comprises one or more entries that specify a session identifier. In some examples, the session identifier comprises one or more of a source address, source port, destination address, destination port, or protocol associated with a forward flow and/or a reverse flow of the session. As described above, when routing engine 204 receives a packet for a forward packet flow originating from a client device, e.g., source device 112A of FIG. 1A, and destined for another client device, e.g., destination device 114 of FIG. 1A, routing engine 204 determines whether the packet belongs to a new session (e.g., is the "first" packet or "lead" packet of a session). To determine whether the packet belongs to a new session, routing engine 204 determines whether session information 235 includes an entry corresponding to a source address, source port, destination address, destination port, and protocol of the first packet. If an entry exists, then the session is not a new session. If no entry exists, then the session is new and routing engine 204 generates a session identifier for the session and stores the session identifier in session information 235. Routing engine 204 may thereafter use the session identifier stored in session information 235 for the session to identify subsequent packets as belonging to the same session.

Services information 232 stores information that routing engine 204 may use to identify a service associated with a session. In some examples, services information 232 is in the form of a services table. For example, services information 232 comprises one or more entries that specify a service identifier and one or more of a source address, source port, destination address, destination port, or protocol associated with the service. In some examples, routing engine 204 may query services information 232 with one or more of a source address, source port, destination address, destination port, or protocol of a session for a received packet to determine a service associated with a session. For example, routing engine 204 may determine a service identifier based on a correspondence of a source address, source port, destination address, destination port, or protocol in services information 232 to a source address, source port, destination address, destination port, or protocol specified by a session identifier. Routing engine 204 retrieves, based on the service associated with the packet, one or more service policies 234 corresponding to the identified service. The service policies may include, e.g., a path failover policy, a Dynamic Host Configuration Protocol (DHCP) marking policy, a traffic engineering policy, a priority for network traffic associated with the session, etc. Routing engine 204 applies, to the packet, the one or more service policies 234 that correspond to the service associated with the packet.

In some examples, network device 200 may comprise a session-based router that employs a stateful, session-based routing scheme that enables routing engine 204 to independently perform path selection and traffic engineering. The use of session-based routing may enable network device 200 to eschew the use of a centralized controller, such as an SDN controller, to perform path selection and traffic engineering, and eschew the use of tunnels. In some examples, network device 200 may implement session-based routing as Secure Vector Routing (SVR), provided by Juniper Networks, Inc. In the case where network device 200 comprises a session-based router operating as a network gateway for a site of an enterprise network, network device 200 may establish multiple peer paths over an underlying physical WAN with one or more other session-based routers operating as network gateways for other sites of the enterprise network.

Although primarily described herein as a session-based router, in other examples, network device 200 may comprise a packet-based router in which routing engine 204 employs a packet- or flow-based routing scheme to forward packets according to defined network paths, e.g., established by a centralized controller that performs path selection and traffic engineering. In the case where network device 200 comprises a packet-based router operating as a network gateway for a site of an enterprise network, network device 200 may establish multiple tunnels over an underlying physical WAN with one or more other packet-based routers operating as network gateways for other sites of the enterprise network.

In accordance with the techniques of the disclosure, control unit 202 of network device 200 is configured to collect logical path statistics via BFD 225 probing and data extracted from messages and/or counters at the logical path (e.g., peer path or tunnel) level. In some examples, control unit 202 is configured to collect statistics and/or sample other data according to a first periodic interval, e.g., every 3 seconds, every 5 seconds, etc. Control unit 202 may store the collected and sampled data as path data, e.g., in a buffer. In some examples, a path data agent 238 may periodically create a package of the path data according to a second periodic interval, e.g., every 3 minutes. The collected and sampled data included in the package of path data may be referred to herein as "oc-stats." In some examples, the package of path data may also include details about clients connected to network device 200 and the associated client sessions. Path data agent 238 may then report the package of path data to NMS 130 in the cloud. In other examples, NMS 130 may request, retrieve, or otherwise receive the package of path data from network device 200 via an API, an open configuration protocol, or another of communication protocols 223. The package of path data created by path data agent 238 or another module of control unit 202 may include a header identifying network device 200 and the statistics and data samples for each of the logical paths from network device 200. In still other examples, the path data may include event-driven data such that path data agent 238 reports the event-drive path data to NMS 130 in the cloud in response to the occurrence of certain events at network device 200 as the events happen. The event-driven path data may be referred to herein as "oc-events."

Figure 3:
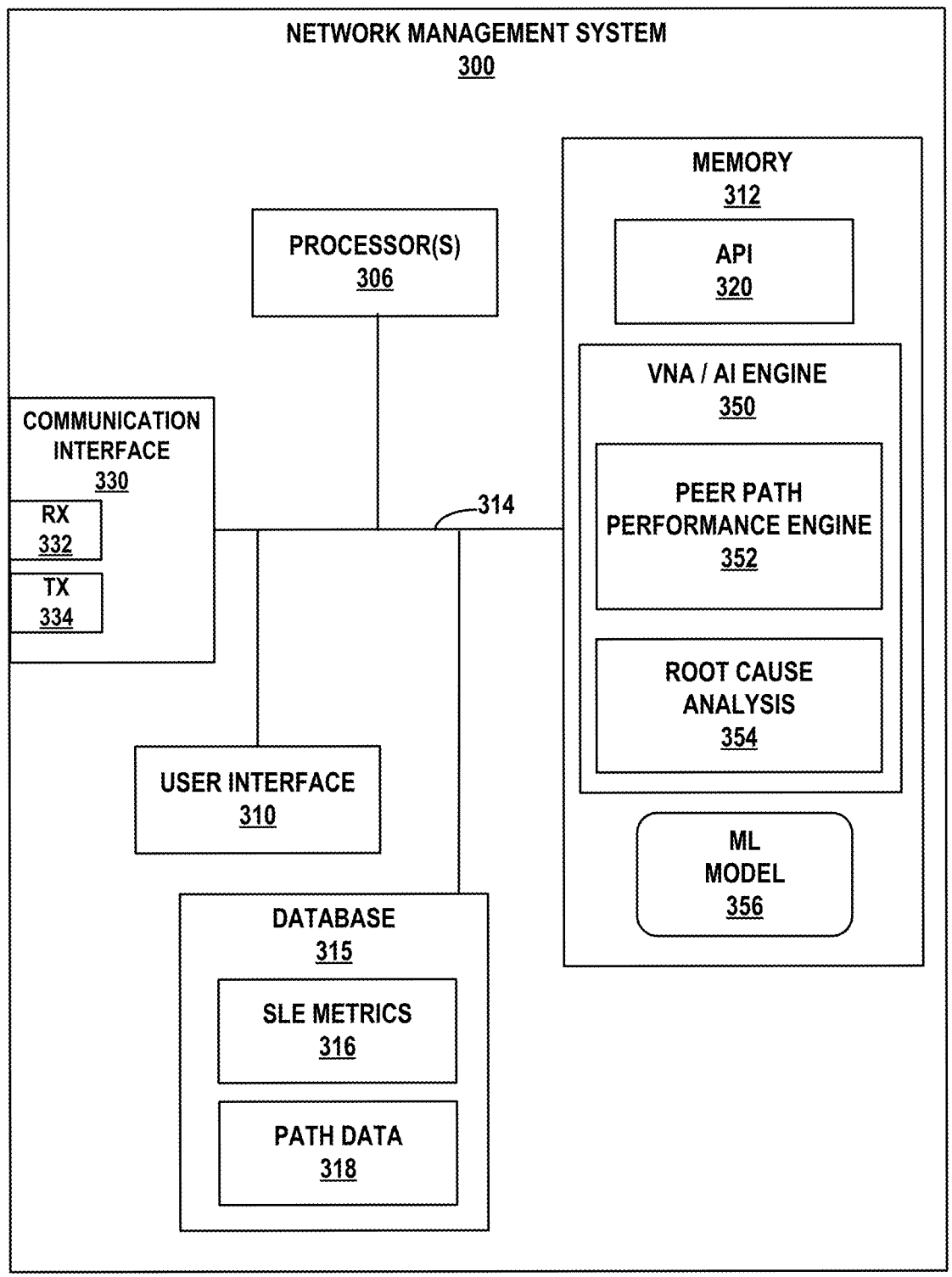
FIG. 3 shows an example network management system configured in accordance with one or more techniques of this disclosure.

FIG. 3 shows an example network management system (NMS) 300 configured in accordance with one or more techniques of this disclosure. NMS 300 may be used to implement, for example, NMS 130 in FIGS. 1A-1C. In such examples, NMS 300 is responsible for monitoring and management of one or more of network devices 110A-110I of FIG. 1A of networks 102, routers 187A, 187B of FIGS. 1B-1C, or network device 200 of FIG. 2.

In this example, NMS 300 receives path data collected by network devices 110A-110N. The path data may comprise statistics and data samples at a logical path (e.g., peer path or tunnel) level, such as telemetry data and data extracted from messages and/or counters. In some examples, the path data may also include details about clients connected to the network devices 110. In further examples, the path data may include event-drive path data that is reported in response to the occurrence of certain events at network devices 110. NMS 300 uses the path data to calculate one or more SLE metrics in order to monitor the health condition of the logical paths from network devices 110 over an underlying physical WAN, and detect network failures and performance degradation that may impact user experiences. In some examples, NMS 300 may be a server as part of a micro-services cloud infrastructure within or accessible by network system 100 of FIGS. 1A-1C.

In some examples, in addition to monitoring network devices 110, NMS 300 is also responsible for monitoring and management of one or more wireless or wired networks (e.g., wireless network 173 and wired LAN 175 of FIG. 1), in addition to monitoring network devices of service providers or other networks. In this example, NMS 300 also receives data collected by access points from user equipment (e.g., user devices 171 of FIG. 1), such as data used to determine outlier logical paths, and analyzes this data for cloud-based management of the wireless networks. In this manner, a single NMS 300 can be used for management of both network devices 110, which may include virtualized network devices (e.g., software-based routers executing on a virtual machine or container), and wireless networks, for an end-to-end WAN assurance system viewable via a single cloud-based WAN assurance portal.

NMS 300 includes a communications interface 330, one or more processor(s) 306, a user interface device 310, a memory 312, and path data 318. The various elements are coupled together via a bus 314 over which the various elements may exchange data and information. Processor(s) 306 execute software instructions, such as those used to define a software or computer program, stored to a computer-readable storage medium (such as memory 312), such as non-transitory computer-readable mediums including a storage device (e.g., a disk drive, or an optical drive) or a memory (such as Flash memory or RAM) or any other type of volatile or non-volatile memory, that stores instructions to cause the one or more processors 306 to perform the techniques described herein. User interface device 310 may be any suitable device for outputting data, such as a display device that outputs one or more user interfaces (e.g., one or more graphical user interfaces).

Communications interface 330 may include, for example, an Ethernet interface. Communications interface 330 couples NMS 300 to a network and/or the Internet, such as any of network(s) 102 as shown in FIG. 1A, and/or any wide area networks or local area networks. Communications interface 330 includes a receiver 332 and a transmitter 334 by which NMS 300 receives/transmits data and information to/from any of network devices 110 and/or any other devices or systems forming part of networks 102 or 104 such as shown in FIG. 1A. The data and information received by NMS 300 may include, for example, network performance data, SLE-related or event log data received from network devices 110 and used by NMS 300 to remotely monitor the performance of network devices 110 and networks 102. In some examples, NMS may further transmit data via communications interface 330 to any of network devices 110 to remotely manage networks 102.

Memory 312 includes one or more devices configured to store programming modules and/or data associated with operation of NMS 300. For example, memory 312 may include a computer-readable storage medium, such as non-transitory computer-readable mediums including a storage device (e.g., a disk drive, or an optical drive) or a memory (such as Flash memory or RAM) or any other type of volatile or non-volatile memory, that stores instructions to cause the one or more processor(s) 306 to perform the techniques described herein.

In this example, memory 312 includes an API 320, a virtual network assistant (VNA)/AI engine 350 including a peer path performance engine 352 and a root cause analysis engine 370, and an ML model 356. NMS 300 may also include any other programmed modules, software engines and/or interfaces configured for remote monitoring and management of network devices 110, including remote monitoring and management of any of network devices 110. NMS 300 may also include any other programmed modules, software engines and/or interfaces configured for remote monitoring and management of wireless networks, including remote monitoring and management of any of access points.

VNA/AI engine 350 analyzes path data 318 received from network devices 110 as well as its own data to identify when undesired or abnormal states are encountered in one of networks 102. For example, VNA/AI engine 350 may use root cause analysis module 354 to identify the root cause of any undesired or abnormal states. In some examples, root cause analysis module 354 utilizes artificial intelligence-based techniques to help identify the root cause of any poor SLE metric(s) and/or poor network performance at one or more of networks 102. In addition, VNA/AI engine 350 may automatically invoke one or more corrective actions intended to address the identified root cause(s) of one or more poor SLE metrics and/or poor performance. Examples of corrective actions that may be automatically invoked by VNA/AI engine 350 may include, but are not limited to, invoking API 320 to reboot one or more network devices 110. The corrective actions may further include restarting a switch and/or a router, invoking download of new software to a network device, switch, or router, etc. These corrective actions are given for example purposes only, and the disclosure is not limited in this respect. If automatic corrective actions are not available or do not adequately resolve the root cause, VNA/AI engine 350 may proactively provide a notification including recommended corrective actions to be taken by IT personnel to address the network error.

VNA/AI engine 350 may, in some examples, construct, train, apply and retrain supervised and/or unsupervised ML model(s) 356 to event data (e.g., SLE metrics 316) to determine whether the collected network event data represents anomalous behavior that needs to be further analyzed by root cause analysis 354 of VNA/AI engine 350 to facilitate identification and resolution of faults. VNA/AI engine 350 may then apply the ML model 356 to data streams and/or logs of newly collected data (e.g., path data 318) of various network event types (e.g., connectivity events and/or statistics and data extracted from messages, counters, or the like) to detect whether the currently observed network event data with the stream of incoming data is indicative of a normal operation of the system or whether the incoming network event data is indicative of a non-typical system behavior event or trend corresponding to a malfunctioning network that requires mitigation.

When the application of the ML model 356 to path data 318 indicates that mitigation is required, VNA/AI engine 350 may invoke root cause analysis 354 to identify a root cause of the anomalous system behavior and, if possible, trigger automated or semi-automated corrective action. In this way, VNA/AI engine 350 may construct and apply a ML model 356 based on a particular complex network to determine whether to perform further, resource-intensive analysis on incoming streams of path data collected (e.g., in real-time) from network devices within the complex network system.

In accordance with the techniques of this disclosure, peer path performance engine 352 enables set up and tracking of outlier logical paths for each network device 110 and/or each network 102. Peer path performance engine 352 further analyzes network performance data (i.e., path data 318) for logical paths collected by network devices 110, such as any of network devices 110. For example, NMS 300 receives path data 318 from network devices 110 that is indicative of one or more aspects of network performance as monitored on each logical path, e.g., peer path or tunnel, between network devices 110 in an SD-WAN over an underlying physical WAN, and stores path data 318 in database 315 over time. NMS 300 may receive a package of path data 318 from each network device 110 on a periodic interval, e.g., every 3 minutes. The data included in the package of path data 318 may be referred to herein as "oc-stats." In some examples, the package of path data 318 may also include details about clients connected to network devices 110 and the associated client sessions. The package of path data 318 received from each network device 110 may include a header identifying the respective network device 110 and multiple statistics and data samples for each of the logical paths. In some examples, path data 318 may include event-driven data received from network devices 110 in response to the occurrence of certain events at network devices 110 as the events happen. The event-driven path data may be referred to herein as "oc-events." In some examples, NMS 300 may store path data 318 in a database having a micro-services cloud infrastructure with no scaling limits.

NMS 300 executes peer path performance engine 352 to determine, based on path data 318, one or more outlier logical paths out of a set of logical paths. Peer path performance engine 352 may compare a set of logical paths to determine one or more outlier logical paths. The peer path performance engine may compare a set of logical paths that are within the same geographic region out of a plurality of geographic regions, that are within the same organization, that are of similar organizational deployments, or are otherwise associated with a related characteristic. As such, in some examples, NMS 300 may group sets of logical paths into groups based on geographic regions, organizations of the logical paths, and the like, and may perform logical path comparisons for each group of logical paths.

In some examples, path data 318 associated with each logical path in the set of logical path may specify or otherwise indicate metrics that peer path performance engine 352 may compare to determine one or more outlier logical paths. Such metrics may include WAN link metrics such as latency jitter, and loss, application metrics such as retransmissions and round-trip time for TCP acknowledgements, metrics regarding correlation of degraded link performance with high bandwidth usage, metrics regarding long term link stability, and/or a quality of service (e.g., a mean opinion score). Peer path performance engine 352 may therefore compare a set of logical paths by comparing one or more metrics indicated by the path data 318 associated with each logical path in the set of logical paths to determine one or more outlier logical paths having a reduced network performance compared with other logical paths.

In some examples, peer path performance engine 352 may determine a network performance associated with a logical path in the set of logical paths to be an outlier if the network performance is below a specified performance threshold. For example, a network performance associated with a logical path in the set of logical paths may be an outlier if the network performance is in the bottom 5% of network performance for the set of logical paths.

In some examples, peer path performance engine 352 may determine the one or more outlier logical paths based on network performance data for a wide deployment of logical paths that are collected over a long time horizon, such as data collected over a week, over two weeks, over a month, and the like, and peer path performance engine 352 may compare the network performance data of the logical paths against each other and/or against a global distribution of the network performance data of the logical paths. Peer path performance engine 352 may compare features derived from the network performance data of the logical paths against each other to determine one or more outlier logical paths, which may be one or more logical paths that deviate from the global distribution of the features derived from the network performance data of the logical paths.

Specifically, in some examples, to compare the network performance of a set of logical paths, peer path performance engine 352 may determine to compare the set of logical paths by comparing a set of metrics specified by path data 318 for each of the set of logical paths. Peer path performance engine 352 may, for each logical path, generate a baseline distribution for each metric of the set of metrics being used to compare the network performance of the set of logical paths. For example, if path performance engine 352 detects outliers in latency, jitter, and loss for the set of logical paths, peer path performance engine 352 may, for each logical path, determine a baseline distribution of latency, a baseline distribution of jitter, and a baseline distribution of loss.

Peer path performance engine 352 may, for each logical path of the set of logical path, periodically derive values of one or more features from raw data at fixed time windows. Examples of fixed time windows may include one week (e.g., one week's worth of data), two weeks (e.g., two weeks' worth of data), thirty days (e.g., thirty days' worth of data), and the like. In some examples, the one or more features may include any combination of the mean, the median, the count of values above fixed thresholds, standard deviations, $75^{th}$ and $90^{th}$ quantiles, skewness, kurtosis, and the like.

Peer path performance engine 352 may determine, for each logical path and for each metric to be compared, values of one or more features for the metric. In the example where peer path performance engine 352 detects outliers in latency, jitter, and loss for the set of logical paths, peer path performance engine 352 may, for each logical path, periodically derive values of the one or more features for the latency, jitter, and loss from raw data at fixed time windows.

Peer path performance engine 352 may generate a vector from the values of the derived one or more features for each logical path of the set of logical paths. That is, peer path performance engine 352 may, for each logical path, generate one or more vectors, where each vector includes the derived values of the one or more features, and peer path performance engine 352 may determine, for each metric being compared, a vector of one or more features for each logical path. For example, if peer path performance engine 352 detects outliers in latency, jitter, and loss for the set of logical paths, and if the mean, median, and count of values above fixed thresholds are the one or more features from which values are derived, peer path performance engine 352 may, for each logical path, generate a vector that includes the values for the mean, median, and count of values above fixed thresholds for the latency, a vector that includes the values for the mean, median, and count of values above fixed thresholds for the jitter, and a vector that includes the values for the mean, median, and count of values above fixed thresholds for the loss.

Peer path performance engine 352 may compare the values of the one or more features for each logical path of the set of logical paths to determine whether the values of one or more features of a logical path indicates that the logical path is a outlier logical path. For example, peer path performance engine 352 may estimate the mean and covariance of the distribution of the vectors of the set of logical paths using techniques such as minimum covariance determinant. Peer path performance engine 352 may, for each metric, estimate the mean and covariance of the vectors of the set of logical paths for that metric. For example, if peer path performance engine 352 detects outliers in latency, jitter, and loss for the set of logical paths, peer path performance engine 352 may estimate the mean and covariance of the distribution of the set of vectors of the set of logical paths for latency, estimate the mean and covariance of the distribution of the set of vectors of the set of logical paths for jitter, and estimate the mean and covariance of the distribution of the set of vectors of the set of logical paths for loss.

Peer path performance engine 352 may use multivariate distance metrics such as Mahalanobis distance, which is a measure of the distance between a point P and a distribution D, to detect outliers from the mean of the vector distribution. If peer path performance engine 352 determines that the vector values of a logical path is more than a specified distance away from the mean of the distribution of the vectors, such as greater than one standard deviation, more than two standard deviation, etc., peer path performance engine 352 may determine that the logical path is an outlier logical path.

For example, if peer path performance engine 352 detects outliers in latency for the set of logical paths, peer path performance engine 352 may determine, for each logical path, the distance of the vector of the logical path for latency from the mean of the vector distribution for latency. If peer path performance engine 352 determines, for a logical path, that the distance of the vector of the logical path for latency from the mean of the vector distribution for latency is greater than a specified threshold distance, such as greater than one standard deviation, peer path performance engine 352 may determine that the logical path is an outlier logical path for latency.

Peer path performance engine 352 may validate the determined one or more outlier logical paths based at least in part on determining whether the baseline distribution values for the one or more outlier paths are degraded compared to normal paths. That is, peer path performance engine 352 may compare the baseline distribution values of a logical path determined to be an outlier logical path against the baseline distribution values of other logical paths in the set of logical paths. For example, if peer path performance engine 352 determines that a logical path is an outlier logical path for latency, peer path performance engine 352 may compare the baseline distribution values of the logical path for latency against the baseline distribution values of other logical paths in the set of logical paths for latency. If peer path performance engine 352 determines that the baseline distribution values of the logical path for latency is in a bottom percentile of the set of logical paths for latency, such as in the bottom 5%, bottom 10%, etc., peer path performance engine 352 may confirm that the logical path is an outlier logical path for latency.

Peer path performance engine 352 may periodically perform such logical path comparisons of a set of logical paths based on updated path data (e.g., path data 318) received from network devices 110. For example, peer path performance engine 352 may compare a set of logical paths every 3 minutes, every 5 minutes, and the like to periodically determine one or more outlier logical paths out of the set of logical paths. Such periodic comparison of logical paths may enable an administrator to gain insight to situations when a logical path may become an outlier logical path (e.g., exhibit poor network performance), such as determining specific time(s) during the day when a logical path is an outlier logical path out of the set of logical paths. In some examples, peer path performance engine 352 may also aggregate path data 318 over a selected period of time (e.g., today, last 7 days, etc.) and at a selected granularity-level (e.g., site-level or network device-level).

Figure 4:
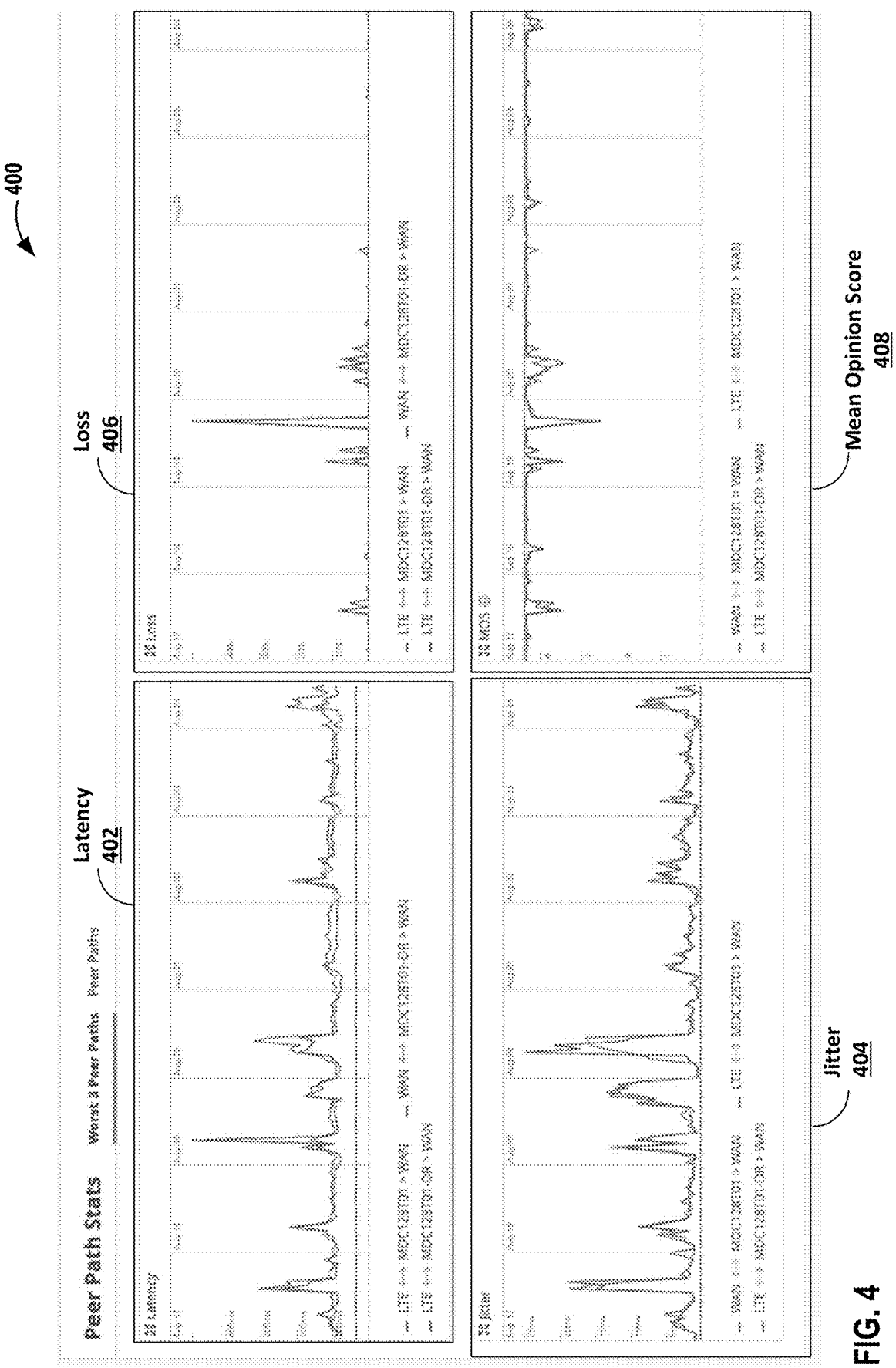
FIG. 4 illustrates an example graphic user interface that provides a view of the link health of logical paths.

FIG. 4 illustrates an example graphic user interface that provides a view of the link health of logical paths. FIG. 4 is described with respect to FIGS. 1-3. A network management system, such as network management system 300, may generate data representative of a graphical user interface for display on a user interface device (e.g., user interface device 310), which may be operated by a network administrator of the enterprise network.

As shown in FIG. 4, network management system 300 may output graphical user interface (GUI) 400 for display at, e.g., user interface device 310, to present indications of the one or more outlier logical paths in the WAN. GUI 400 may present views of one or more network performance metrics for multiple peer paths (e.g., logical paths) over the WAN. Such peer paths may be logical paths within a specific region (e.g., a geographic region), logical paths within an organization (e.g., a company or a division of the company), logical paths of similar organizational deployments, and the like.

GUI 400 may provide the option to present views of one or more network performance metrics for all of a plurality of logical paths (e.g., all logical paths within a specific region or organization) or the worst performing logical paths (e.g., the logical paths having the worst network performance) out of the plurality of logical paths. In the example of FIG. 4, GUI 400 presents views of one or more network performance metrics for the three worst performing logical paths out of the plurality of logical paths.

Specifically, as shown in FIG. 4, GUI 400 may present a visualization of the latency 402, jitter 404, packet loss 406, and mean opinion score (MOS) 408 of the three worst performing logical paths over a seven day period. That is, for each of the four network performance metrics of latency, jitter, packet loss, and mean opinion score, GUI 400 may present a visualization of the network performance of the worst performing three logical paths for that network performance metric. As such, the network performance of different network paths may be included in different visualizations of the latency 402, jitter 404, packet loss 406, and mean opinion score 408 in GUI 400. None of the visualizations of the latency 402, jitter 404, packet loss 406, and mean opinion score 408 of the three worst performing logical paths indicate that any of the three worst performing logical paths is an outlier logical path.

Figure 5:
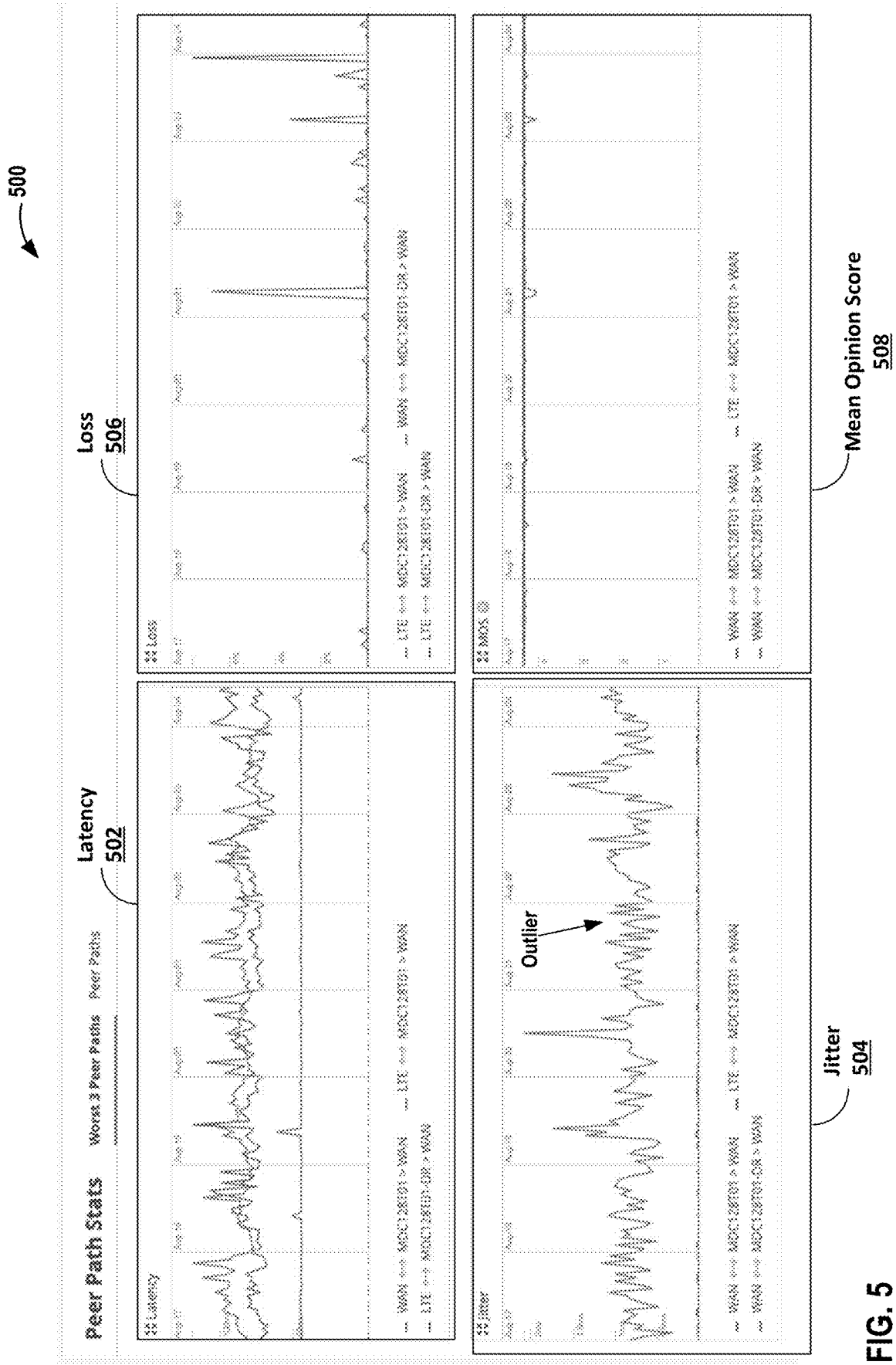
FIG. 5 illustrates an example graphic user interface that provides a view of the link health of logical paths.

FIG. 5 illustrates an example graphic user interface that provides a view of the link health of logical paths. FIG. 5 is described with respect to FIGS. 1-3. A network management system, such as network management system 300, may generate data representative of a graphical user interface for display on a user interface device (e.g., user interface device 310), which may be operated by a network administrator of the enterprise network.

As shown in FIG. 5, network management system 300 may output graphical user interface (GUI) 500 for display at, e.g., user interface device 310, to present indications of the one or more outlier logical paths in the WAN. GUI 500 may present views of one or more network performance metrics for multiple peer paths (e.g., logical paths) over the WAN. Such peer paths may be logical paths within a specific region (e.g., a geographic region), logical paths within an organization (e.g., a company or a division of the company), logical paths of similar organizational deployments, and the like.

GUI 500 may provide the option to present views of one or more network performance metrics for all of a plurality of logical paths (e.g., all logical paths within a specific region or organization) or the worst performing logical paths (e.g., the logical paths having the worst network performance) out of the plurality of logical paths. In the example of FIG. 5, GUI 500 presents views of one or more network performance metrics for the three worst performing logical paths out of the plurality of logical paths.

Specifically, as shown in FIG. 5, GUI 500 may present a visualization of the latency 502, jitter 504, packet loss 506, and mean opinion score (MOS) 508 of the three worst performing logical paths over a seven day period. That is, for each of the four network performance metrics of latency, jitter, packet loss, and mean opinion score, GUI 500 may present a visualization of the network performance of the worst performing three logical paths for that network performance metric. As such, the network performance of different network paths may be included in different visualizations of the latency 502, jitter 504, packet loss 506, and mean opinion score 508 in GUI 400.

As can be seen in the visualization of jitter 504 in GUI 500, in which indicate the latency of two WAN links and an LTE link, the LTE link's jitter is very different from the jitter of the other two logical links. The visualization of the jitter 504 of the LTE link provided by GUI 500 may therefore indicate that the particular LTE link is an outlier logical path.

Figure 6:
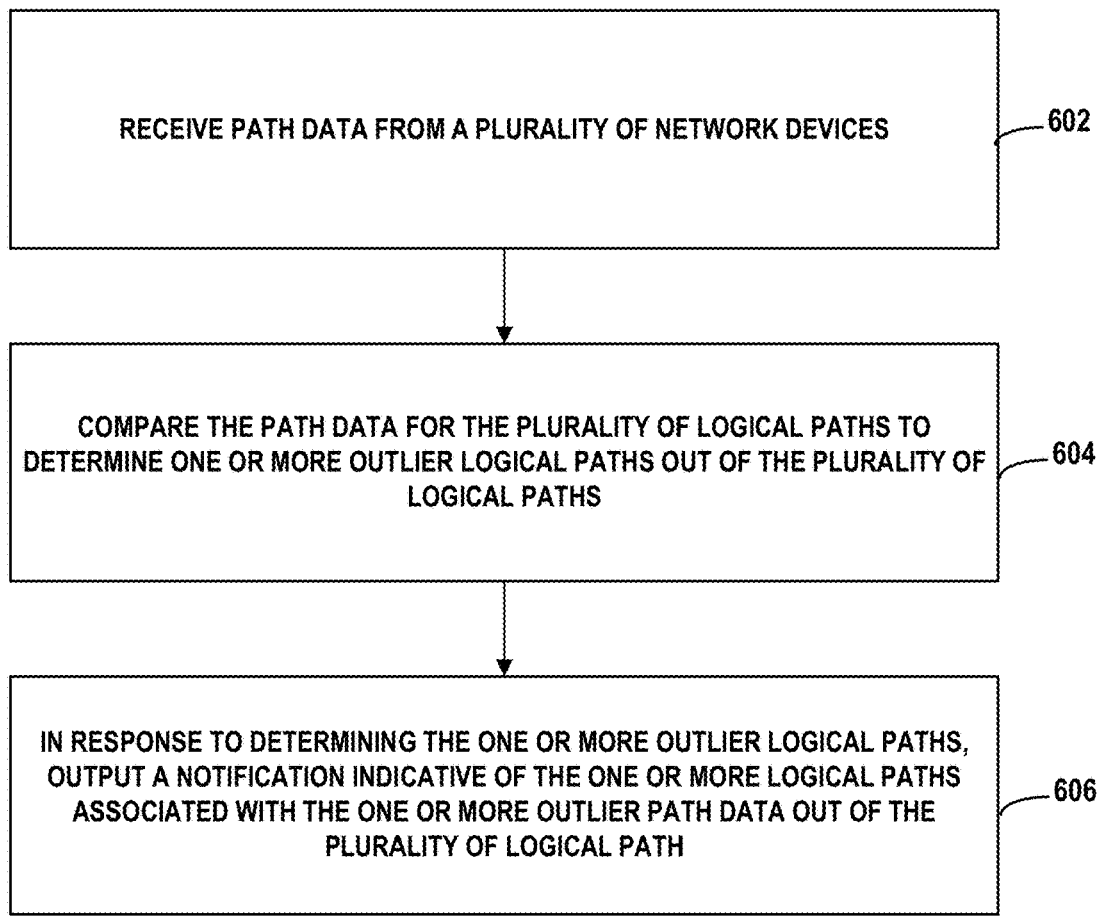
FIG. 6 is a flowchart illustrating example operations performed by an example network management system.

FIG. 6 is a flowchart illustrating example operations performed by an example network management system. FIG. 6 is described with respect to FIGS. 1-5.

As shown in FIG. 6, one or more processors 306 of network management system 300 may receive path data from network devices 110, and each of network devices 110 may collect the path data for a respective one or more logical paths of a physical interface from the given network device over a wide area network (WAN) (602). One or more processors 306 of network management system 300 may compare path data for a plurality of logical paths to determine one or more outlier logical paths out of the plurality of logical paths (604). One or more processors 306 of network management system 300 may, in response to determining the one or more outlier logical paths, output a notification indicative of the one or more outlier path data out of the plurality of logical paths (606).

In some examples, to compare the path data to determine the one or more outlier logical paths out of the plurality of logical paths, one or more processors 306 of network management system 300 may compare one or more network performance metrics specified by the path data for each of the plurality of logical paths and determine, based on comparing the one or more network performance metrics, the one or more outlier logical paths out of the plurality of logical paths.

In some examples, to determine the one or more outlier logical paths out of the plurality of logical paths, one or more processors 306 of network management system 300 may determine, based on comparing the one or more network performance metrics, one or more logical paths that perform below a specified performance threshold out of the plurality of logical paths as the one or more outlier logical paths.

In some examples, to compare the one or more network performance metrics specified by the path data for each of the plurality of logical paths, one or more processors 306 of network management system 300 may derive, for each of the plurality of logical paths within a specified time window, one or more features of each of the one or more network performance metrics and generate a plurality of vectors, including generating, for each respective network performance metric of the one or more network performance metrics for each of the plurality of logical paths, a respective vector of values of the one or more features for the respective network performance metric.

In some examples, to determine, based on comparing the one or more network performance metrics, the one or more outlier logical paths out of the plurality of logical paths, one or more processors 306 of network management system 300 may estimate a mean and a covariance of a distribution of the plurality of vectors, determine, for a vector for a network performance metric of a logical path out of the plurality of logical paths, a distance of the vector from the mean of the distribution of the plurality of vectors, and determine, based at least in part on the distance of the vector from the mean of the distribution of the plurality of vectors, that the logical path is an outlier logical path.

In some examples, the one or more features include one or more of: a mean, a median, a count of one or more values above one or more specified thresholds, a standard deviation, one or more quantiles, a skewness, a kurtosis.

In some examples, the one or more network performance metrics include one or more of: latency, jitter, packet loss, mean opinion score, retransmissions, or round trip times for Transmission Control Protocol (TCP) acknowledgements for each of the plurality of logical paths.

In some examples, one or more processors 306 of network management system 300 may receive a package of path data from each network device on a periodic interval, where the package of path data from each network device includes a header identifying the respective network device and multiple statistics and data samples for each of the plurality of logical paths.

In some examples, the plurality of network devices comprise two or more session-based routers configured to establish peer paths as logical paths of the physical interface between the two or more session-based routers over the WAN, and one or more processors 306 of network management system 300 may receive the path data collected for each peer path from software agents imbedded in the two or more session-based routers.

In some examples, the plurality of network devices comprise two or more packet-based routers configured to establish tunnels as logical paths of the physical interface between the two or more packet-based routers over the WAN, and one or more processors 306 of network management system 300 may retrieve the path data collected for each tunnel from the two or more packet-based routers using an application programming interface (API) or an open configuration protocol.

Aspects of this disclosure includes the following examples.

Example 1. A network management system comprising: a memory storing path data for a plurality of logical paths received from a plurality of network devices operating as network gateways for an enterprise network, the path data collected by each network device of the plurality of network devices for a respective one or more logical paths of a physical interface from the given network device over a wide area network (WAN); and one or more processors coupled to the memory and configured to: compare the path data for the plurality of logical paths to determine one or more outlier logical paths out of the plurality of logical paths; and in response to determining the one or more outlier logical paths, output a notification indicative of the one or more outlier logical paths out of the plurality of logical paths.

Example 2. The network management system of example 1, wherein to compare the path data to determine the one or more outlier logical paths out of the plurality of logical paths, the one or more processors are further configured to: compare the path data for the plurality of logical paths to determine one or more outlier path data associated with one or more logical paths out of the plurality of logical paths; and determine the one or more logical paths associated with the one or more outlier path data out of the plurality of logical paths as the one or more outlier logical paths.

Example 3. The network management system any of examples 1 and 2, wherein the path data comprises performance data for each of the plurality of logical paths.

Example 4. The network management system of any of examples 1-3, wherein to compare the path data to determine the one or more outlier logical paths out of the plurality of logical paths, the one or more processors are further configured to: determine, based at least in part on the performance data, one or more logical paths that perform below a specified performance threshold out of the plurality of logical paths as the one or more outlier logical paths.

Example 5. The network management system any of examples 1-4, wherein the path data comprises one or more of: latency, jitter, and packet loss for each of the plurality of logical paths.

Example 6. The network management system any of examples 1-5, wherein the path data comprises Bidirectional Forwarding Detection (BFD) data for each of the plurality of logical paths.

Example 7. The network management system of any of examples 1-6, wherein the plurality of logical paths are associated with a geographic region out of a plurality of geographic regions.

Example 8. The network management system of any of examples 1-7, wherein the plurality of logical paths are associated with an organization out of a plurality of organizations.

Example 9. The network management system of any of examples 1-8, wherein one or more outlier logical paths out of the plurality of logical paths are outliers during a specific time of day.

Example 10. The network management system of any of examples 1-9, wherein the one or more processors are configured to receive a package of path data from each network device on a periodic interval, and wherein the package of path data from each network device includes a header identifying the respective network device and multiple statistics and data samples for each of the logical paths.

Example 11. The network management system of any of examples 1-10, wherein the plurality of network devices comprise two or more session-based routers configured to establish peer paths as logical paths of the physical interface between the two or more session-based routers over the WAN, and wherein the one or more processors of the network management system are configured to receive the path data collected for each peer path from software agents imbedded in the session-based routers.

Example 12. The network management system of any of examples 1-11, wherein the plurality of network devices comprise two or more packet-based routers configured to establish tunnels as logical paths of the physical interface between the two or more packet-based routers over the WAN, and wherein the one or more processors of the network management system are configured to retrieve the path data collected for each tunnel from the packet-based routers using an application programming interface (API) or an open configuration protocol.

Example 13. The network management system of any of examples 1-12, wherein the notification includes a recommendation to perform one or more remedial actions to address the one or more outlier logical paths.

Example 14. The network management system of any of examples 1-13, wherein the one or more processors are configured to invoke one or more remedial actions to address the one or more outlier logical paths.

Example 15. The network management system of any of examples 1-14 wherein, to output the notification, the one or more processors are configured to output the notification via a user interface for display on a user interface device of an administrator associated with the network.

Example 16. A method for performing the techniques of any of examples 1-15.

Example 17. An apparatus comprising means for performing the techniques of any of examples 1-15.

Example 18. A computer-readable storage medium comprising instructions that, when executed, cause one or more processors of a network management system to operate as recited in examples 1-15.

Example 19. A network system comprising: a plurality of network devices operating as network gateways for an enterprise network, each network device of the plurality of network devices configured to periodically create a package of path data collected for one or more logical paths of a physical interface from the network device over a wide area network (WAN), wherein the package of path data includes a header identifying the respective network device and multiple statistics and data samples for each of the logical paths; and a network management system comprising: a memory storing the path data received from the plurality of network devices; and one or more processors coupled to the memory and configured to operate as recited in any of examples 1-15.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

What is claimed is:

1. A network management system comprising:
a memory storing path data for a plurality of logical paths received from a plurality of network devices operating as network gateways for an enterprise network, the path data collected by each network device of the plurality of network devices for a corresponding one or more logical paths of a physical interface from a given network device over a wide area network (WAN); and
one or more processors coupled to the memory and configured to:
compare one or more network performance metrics specified by the path data for each of the plurality of logical paths, including:
deriving, for each of the plurality of logical paths within a specified time window, one or more features of each of the one or more network performance metrics specified by the path data for each of the plurality of logical paths, and
generating a plurality of vectors, including generating, for each respective network performance metric of the one or more network performance metrics for each of the plurality of logical paths, a corresponding vector of values of the one or more features for the respective network performance metric;
determine, based on comparing the one or more network performance metrics, one or more outlier logical paths out of the plurality of logical paths; and
in response to determining the one or more outlier logical paths, output a notification indicative of the one or more outlier logical paths out of the plurality of logical paths.

2. The network management system of claim 1, wherein to determine the one or more outlier logical paths out of the plurality of logical paths, the one or more processors are further configured to:
determine, based on comparing the one or more network performance metrics, one or more logical paths that perform below a specified performance threshold out of the plurality of logical paths as the one or more outlier logical paths.

3. The network management system of claim 1, wherein to determine, based on comparing the one or more network performance metrics, the one or more outlier logical paths out of the plurality of logical paths, the one or more processors are further configured to:
estimate a mean and a covariance of a distribution of the plurality of vectors;
determine, for a vector for a network performance metric of a logical path out of the plurality of logical paths, a distance of the vector from the mean of the distribution of the plurality of vectors; and
determine, based at least in part on the distance of the vector from the mean of the distribution of the plurality of vectors, that the logical path is an outlier logical path.

4. The network management system of claim 1, wherein the one or more features include one or more of: a mean, a median, a count of one or more values above one or more specified thresholds, a standard deviation, one or more quantiles, a skewness, a kurtosis.

5. The network management system of claim 1, wherein the one or more network performance metrics include one or more of: latency, jitter, packet loss, mean opinion score, retransmissions, or round trip times for Transmission Control Protocol (TCP) acknowledgements for each of the plurality of logical paths.

6. The network management system of claim 1, wherein the one or more processors are configured to receive a package of path data from each network device on a periodic interval, and wherein the package of path data from each network device includes a header identifying the respective network device and multiple statistics and data samples for each of the plurality of logical paths.

7. The network management system of claim 1, wherein the plurality of network devices comprise two or more session-based routers configured to establish peer paths as logical paths of the physical interface between the two or more session-based routers over the WAN, and wherein the one or more processors of the network management system are configured to receive the path data collected for each peer path from software agents imbedded in the two or more session-based routers.

8. The network management system of claim 1, wherein the plurality of network devices comprise two or more packet-based routers configured to establish tunnels as logical paths of the physical interface between the two or more packet-based routers over the WAN, and wherein the one or more processors of the network management system are configured to retrieve the path data collected for each tunnel from the two or more packet-based routers using an application programming interface (API) or an open configuration protocol.

9. A method comprising:
- receiving, by one or more processors of a network management system from plurality of network devices operating as network gateways for an enterprise network, path data for a plurality of logical paths collected by each network device of the plurality of network devices for a respective one or more logical paths of a physical interface from a given network device over a wide area network (WAN);
- comparing, by the one or more processors, one or more network performance metrics specified by the path data for each of the plurality of logical paths, including:
  - deriving, for each of the plurality of logical paths within a specified time window, one or more features of each of the one or more network performance metrics specified by the path data for each of the plurality of logical paths, and
  - generating a plurality of vectors, including generating, for each respective network performance metric of the one or more network performance metrics for each of the plurality of logical paths, a corresponding vector of values of the one or more features for the respective network performance metric;
- determining, by the one or more processors and based on comparing the one or more network performance metrics, one or more outlier logical paths out of the plurality of logical paths; and
- in response to determining the one or more outlier logical paths, outputting, by the one or more processors, a notification indicative of the one or more outlier logical paths out of the plurality of logical paths.

10. The method of claim 9, wherein comparing the one or more outlier logical paths out of the plurality of logical paths further comprises:
- determining, by the one or more processors and based on comparing the one or more network performance metrics, one or more logical paths that perform below a specified performance threshold out of the plurality of logical paths as the one or more outlier logical paths.

11. The method of claim 9, wherein determining, based on comparing the one or more network performance metrics, the one or more outlier logical paths out of the plurality of logical paths further comprises:
- estimating, by the one or more processors, a mean and a covariance of a distribution of the plurality of vectors;
- determining, by the one or more processors for a vector for a network performance metric of a logical path out of the plurality of logical paths, a distance of the vector from the mean of the distribution of the plurality of vectors; and
- determining, by the one or more processors and based at least in part on the distance of the vector from the mean of the distribution of the plurality of vectors, that the logical path is an outlier logical path.

12. The method of claim 9, wherein the one or more features include one or more of: a mean, a median, a count of one or more values above one or more specified thresholds, a standard deviation, one or more quantiles, a skewness, a kurtosis.

13. The method of claim 9, wherein the one or more network performance metrics include one or more of: latency, jitter, packet loss, mean opinion score, retransmissions, or round trip times for Transmission Control Protocol (TCP) acknowledgements for each of the plurality of logical paths.

14. The method of claim 9, wherein the plurality of network devices comprise two or more session-based routers configured to establish peer paths as logical paths of the physical interface between the two or more session-based routers over the WAN, and wherein receiving the path data further comprises:
- receiving, by the one or more processors, the path data collected for each peer path from software agents imbedded in the two or more session-based routers.

15. The method of claim 9, wherein the plurality of network devices comprise two or more packet-based routers configured to establish tunnels as logical paths of the physical interface between the two or more packet-based routers over the WAN, and wherein receiving the path data further comprises:
- retrieving, by the one or more processors, the path data collected for each tunnel from the two or more packet-based routers using an application programming interface (API) or an open configuration protocol.

16. A non-transitory computer-readable storage medium comprising instructions that, when executed, cause one or more processors of a network management system to:
- receive, from plurality of network devices operating as network gateways for an enterprise network, path data for a plurality of logical paths collected by each network device of the plurality of network devices for a respective one or more logical paths of a physical interface from a given network device over a wide area network (WAN);
- compare one or more network performance metrics specified by the path data for each of the plurality of logical paths, including:
  - deriving, for each of the plurality of logical paths within a specified time window, one or more features of each of the one or more network performance metrics specified by the path data for each of the plurality of logical paths, and
  - generating a plurality of vectors, including generating, for each respective network performance metric of the one or more network performance metrics for each of the plurality of logical paths, a corresponding vector of values of the one or more features for the respective network performance metric:

determine, based on comparing the one or more network performance metrics, one or more outlier logical paths out of the plurality of logical paths; and in response to determining the one or more outlier logical paths, output a notification indicative of the one or more outlier logical paths out of the plurality of logical paths.

\* \* \* \* \*